US007136976B2

(12) United States Patent
Saika

(10) Patent No.: US 7,136,976 B2
(45) Date of Patent: Nov. 14, 2006

(54) SYSTEM AND METHOD FOR BACKUP WHICH SYNCHRONOUSLY OR ASYNCHRONOUSLY STORES ADDITIONAL INFORMATION DEPENDING ON THE TARGET BACKUP DATA

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 225 days.

(21) Appl. No.: 10/794,856

(22) Filed: Mar. 5, 2004

(65) Prior Publication Data

US 2005/0055521 A1    Mar. 10, 2005

(30) Foreign Application Priority Data

Sep. 5, 2003    (JP)    ............................. 2003-313527

(51) Int. Cl.
*G06F 12/16* (2006.01)
(52) U.S. Cl. ..................... 711/162; 711/111; 711/114; 711/161; 707/204; 714/5; 714/6
(58) Field of Classification Search ................ 711/162
See application file for complete search history.

(56) References Cited

U.S. PATENT DOCUMENTS

| 5,148,432 | A | * | 9/1992 | Gordon et al. ................ 714/7 |
| 5,212,784 | A | * | 5/1993 | Sparks ........................ 714/6 |
| 5,333,305 | A | * | 7/1994 | Neufeld ....................... 714/5 |
| 5,734,812 | A | * | 3/1998 | Yamamoto et al. ............ 714/6 |
| 5,742,752 | A | * | 4/1998 | DeKoning .................... 714/6 |
| 6,151,659 | A | * | 11/2000 | Solomon et al. ............. 711/114 |
| 6,286,085 | B1 | * | 9/2001 | Jouenne et al. ............. 711/162 |
| 6,393,516 | B1 | | 5/2002 | Johnson |
| 6,434,681 | B1 | * | 8/2002 | Armangau ................... 711/162 |
| 6,625,623 | B1 | | 9/2003 | Midgley et al. |
| 6,732,244 | B1 | * | 5/2004 | Ashton et al. .............. 711/162 |

(Continued)

FOREIGN PATENT DOCUMENTS

JP    2002-215474    8/2002

OTHER PUBLICATIONS

"The RAIDBook, A Source Book for RAID Technology", Nov. 18, 1993, The RAID Advisroy Board, Edition 1-1, pp. 14, 59, 61.*
Tanenbaum, Andrew S., "Structured Computer Organization", 1984, Prentice-Hall, Inc., 2nd Edition, pp. 10-12.*

*Primary Examiner*—Sanjiv Shah
*Assistant Examiner*—Arpan Savla
(74) *Attorney, Agent, or Firm*—Townsend and Townsend and Crew LLP

(57) ABSTRACT

The present invention makes it possible to suitably create additional information on the basis of backup target data and then store the additional information in a data storage medium. In one embodiment, a system comprises a backup destination storage device (7A) that constitutes a backup destination of backup target data to be a target for backup; a backup source device (1), comprising a backup execution module (11) that backs up the backup target data by transferring the backup target data to the backup destination storage device (7A); an additional information storage medium (7P), which is capable of storing additional information created on the basis of the backup target data; and an additional information creation module (21), which creates additional information on the basis of the backup target data and stores the additional information in the additional information storage medium (7P) after a backup of the backup target data has been completed.

13 Claims, 16 Drawing Sheets

U.S. PATENT DOCUMENTS 6,745,310 B1 * 6/2004 Chow et al. .................. 711/170
6,834,326 B1 * 12/2004 Wang et al. .................. 711/114
6,912,629 B1 * 6/2005 West et al. .................. 711/161
6,959,369 B1 * 10/2005 Ashton et al. .............. 711/162
2003/0188153 A1 * 10/2003 Demoff et al. .............. 713/153
2003/0221075 A1 11/2003 Achiwa et al.
2005/0010733 A1 1/2005 Mimatsu et al.
2005/0060356 A1 3/2005 Saika

* cited by examiner

BACKUP DESTINATION LIST

INFORMATION RELATING TO BACKUP DESTINATION SERVER 5A

INFORMATION RELATING TO BACKUP DESTINATION SERVER 5B

INFORMATION RELATING TO BACKUP DESTINATION SERVER 5C

INFORMATION RELATING TO PARITY STORAGE SERVER 5P

FIG. 5

BACKUP MANAGEMENT TABLE 35

| # | ITEM | REMARKS |
|---|---|---|
| 1 | BACKUP NAME | |
| 2 | BACKUP DATE | |
| 3 | BACKUP DESTINATION QUANTITY | |
| 4 | BACKUP DESTINATION NAME (HOST NAME) | ← # REPETITION OF THREE → |
| 5 | DATA STORAGE START POSITION | |
| 6 | BACKUP SIZE | |
| 7 | NAME (HOST NAME) OF STORAGE DESTINATION FOR PARITY DATA | |
| 8 | DATA STORAGE POSITION | |
| 9 | PARITY SIZE | |

SYSTEM AND METHOD FOR BACKUP WHICH SYNCHRONOUSLY OR ASYNCHRONOUSLY STORES ADDITIONAL INFORMATION DEPENDING ON THE TARGET BACKUP DATA

CROSS-REFERENCES TO RELATED APPLICATIONS

This application relates to and claims priority from Japanese Patent Application No. 2003-313527 filed on Sep. 5, 2003, the entire disclosure of which is incorporated herein by reference.

BACKGROUND OF THE INVENTION

1. Field of the Invention

The present invention relates to a technology for backing up backup target data to be a target for backup.

2. Description of the Related Art

As one example of this type of technology, a technology, whereby a normal server and a failed server cooperate, a substitute server is determined from among a plurality of servers, and the same data saved by the normal server and failed server is then transferred to the substitute server, is known (Japanese Patent Publication Laid Open No. 2002-215474 (paragraph 6), for example).

Further, when backup target data is backed up, parity data for this backup target data is sometimes created as additional information on the basis of the backup target data and the parity data is stored together with the backup target data in a data storage device. With technology for backing up data, the manner in which additional information for this data is stored is sometimes important. For example, when the backup source device performs a backup by transferring backup target data to the data storage device constituting the backup destination, processing to compute and store parity data can be performed in parallel with this backup. However, in cases where the data size of the backup target data is huge, the burden on the backup source device is great.

BRIEF SUMMARY OF THE INVENTION

It is accordingly a feature of the present invention to make it possible to suitably create additional information on the basis of the backup target data and store this additional information in the data storage means.

The backup system according to a first aspect of the present invention comprises a backup destination storage device, which is the backup destination of backup target data to be a target for backup; a backup source device that comprises backup execution means that back up the backup target data by transferring the backup target data to the backup destination storage device; additional information storage means that are capable of storing additional information created on the basis of the backup target data; and additional information creation means that create additional information on the basis of the backup target data after the backup of the backup target data has been completed (a data storage device such as a hard disk, for example), and then store the additional information in the additional information storage means.

Here, "additional information" is information derived from the backup target data, and may be restore information (one example of which is parity data) that is used in order to restore all or part of the backup target data (one example of which is a predetermined number of fragmented data items), or may be a message digest, for example.

In a first preferred embodiment, the additional information creation means are provided in a device separate from the backup source device (one or a plurality of backup destination devices and at least one of the independent devices that are separate from the backup destination devices, for example).

According to a second preferred embodiment, the backup source device further comprises generation data transmission means, which transmit additional information generation data required in order to generate additional information to the additional information creation means; and the additional information creation means receive the additional information generation data, generate the additional information by using the additional information generation data, and store the generated additional information in the additional information storage means.

Here, the additional information generation data are backup destination location information that relates to the location of the backup destination of the backup target data, for example, and the additional information creation means acquire the backed up backup target data from the location specified by the backup destination location information, and create the additional information by using this backup target data.

In the case of the third preferred embodiment, the backup source device further comprises: timing selection means, which select, on the basis of predetermined conditions, either one of synchronous timing for creating the additional information when the backup is performed and asynchronous timing for creating the additional information after the backup has been performed, as the timing for creating the additional information; and synchronous-type additional information creation means, which, when the synchronous timing is selected, create the additional information when the backup is performed and store this additional information in the additional information storage means. Further, in a case where the asynchronous timing is selected, the backup source device transmits additional information generation data required in order to generate additional information to the additional information creation means, and the additional information creation means receive the additional information generation data, generate the additional information by using the additional information generation data, and store the generated additional information in the additional information storage means, for example.

Here, "synchronous timing" is any of the following (1) to (3), for example:

(1) a time directly after the backup target data (or fragmented data described later) is acquired from a predetermined location, or a substantially equivalent time;

(2) a time directly before the backup target data (or fragmented data described later) is transmitted to the backup destination, or a substantially equivalent time;

(3) a time directly after the backup target data (or fragmented data described later) is transmitted to the backup destination, or a substantially equivalent time.

In addition, "asynchronous timing" is a time after the entire backup target data is transmitted to the backup destination, for example. More specifically, "asynchronous timing" is a time designated by the backup source device or by the operator thereof, and is directly after the additional information generation data is input to the additional information creation means.

In the case of the third preferred embodiment, the timing selection means of the second preferred embodiment select either the synchronous timing or the asynchronous timing on the basis of at least one of the data size of the backup target data, the state of communication traffic between the backup source device and the additional information creation means, attributes of the backup target data, and the condition of the data processing in the backup source device.

In the case of the fourth preferred embodiment, a plurality of the backup destination storage device exists; the backup execution means divide up the backup target data into one or more fragmented data groups containing a plurality of fragmented data items, and distribute and transmit a plurality of fragmented data items contained in the divided fragmented data groups to the plurality of backup destination storage devices respectively; the additional information creation means acquire the plurality of respective fragmented data items from the plurality of backup destination storage devices for each of the fragmented data groups, and create the additional information by using the acquired plurality of fragmented data items. In a more preferable example, each of the plurality of fragmented data items is of a predetermined size and the backup execution means add dummy data so that all of the plurality of fragmented data items are of the predetermined size when at least one of the plurality of fragmented data items in the fragmented data groups is less than the predetermined data size.

The additional information creation device according to the present invention comprises: means for creating additional information on the basis of backup target data to be a target for backup after the backup target data has been transferred from a backup source device, which backs up the backup target data, to a backup destination storage device that is capable of storing data and a backup of the backup target data has been completed; and means for storing the created additional information in the additional information storage means.

The backup source device according to the present invention comprises: backup execution means, which back up backup target data to be a target for backup by transferring the backup target data to a backup destination storage device constituting a backup destination for the backup target data; and generation data transmission means, which transmit additional information generation data required in order to generate additional information on the basis of the backup target data to additional information creation means for creating the additional information so that the additional information can be created by using the additional information generation data after a backup of the backup target data has been completed. As a result, after receiving the additional information generation data and the backup of the backup target data is complete, the additional information creation means are able to generate the additional information by using the additional information generation data, and the additional information thus generated can be stored in the additional information storage means that are able to store the additional information.

The backup system according to a second aspect of the present invention is one in which a plurality of servers is communicably connected to a communication network, wherein the plurality of servers include: two or more backup destination servers, which are backup destinations of backup target data to be a target for backup and which store received data in two or more data storage devices respectively; and a backup source server, which divides up the backup target data into one or more fragmented data groups containing two or more fragmented data items, and distribute and transmit the two or more fragmented data items contained in the divided fragmented data groups to the two or more backup destination servers, and wherein at least one server among the plurality of servers comprises: additional information creation means, which acquire the two or more backed up fragmented data items for each of the fragmented data groups, create the additional information by using the two or more acquired fragmented data items, and store the created additional information in additional information storage means.

Each of the devices and means that the system according to the present invention comprises can be implemented by a computer, and a computer program serving this purpose can be installed or loaded on a computer via a variety of media such as disk-type storage, semiconductor memory, and a communication network.

Further, each of the devices and means that the system according to the present invention comprises can also be implemented by special hardware or a programmed computer, or by any combination thereof.

According to a first system of the present invention, because additional information is created on the basis of backup target data after a backup of the backup target data has been completed, the processing load when a backup is being executed by the backup source device is reduced.

BRIEF DESCRIPTION OF THE DRAWINGS

FIG. 4 shows a backup destination list 33;

FIG. 5 shows a backup management table 35;

DETAILED DESCRIPTION OF THE INVENTION

Figure 1:
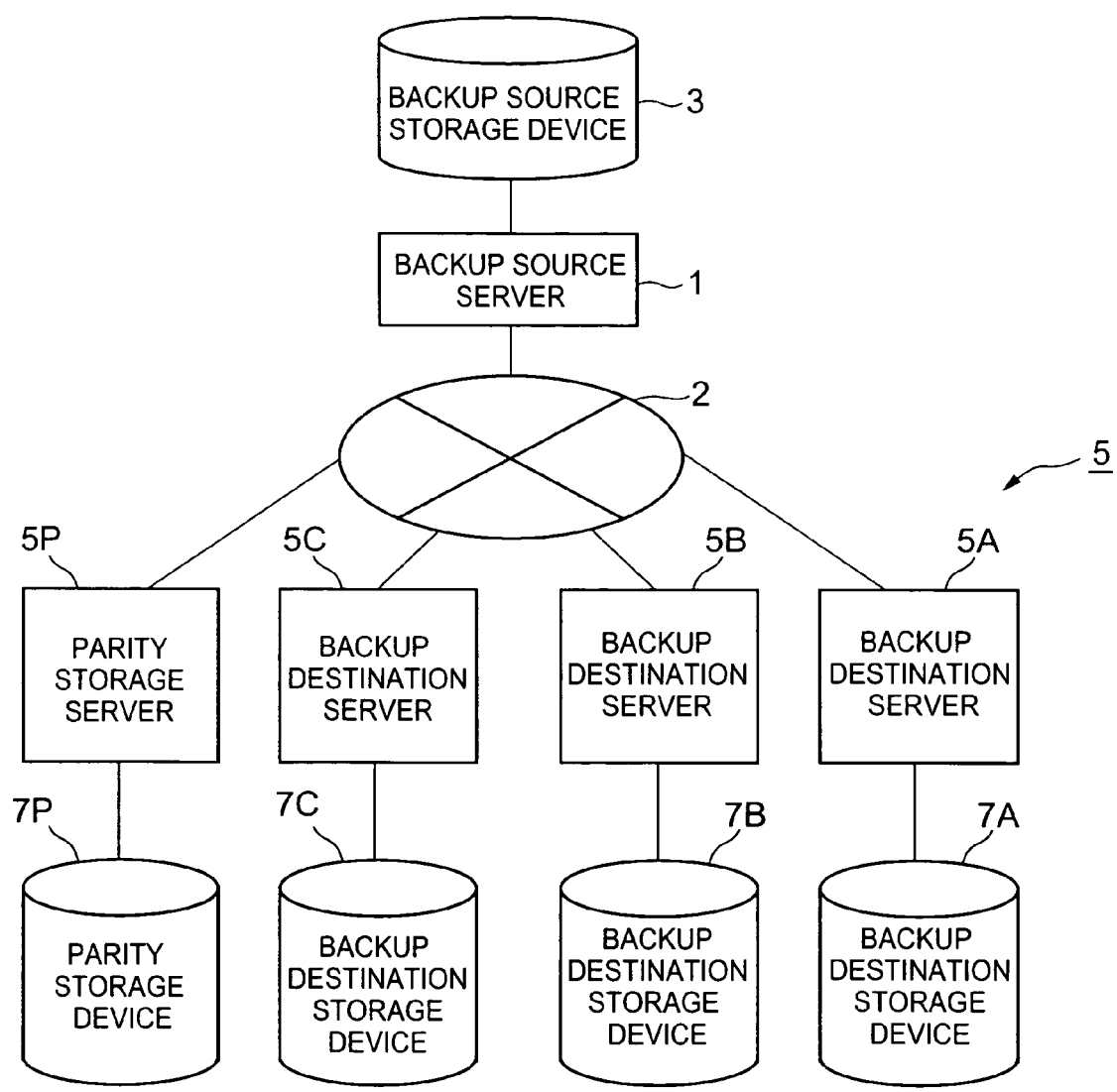
FIG. 1 is a block diagram showing the whole constitution of the backup system according to a first embodiment of the present invention.

FIG. 1 shows the overall constitution of the backup system according to a first embodiment of the present invention.

The backup system according to this embodiment is constituted such that a single backup source server 1 (or a plurality thereof), a plurality (for example, three) of backup destination servers 5A to 5C, and a single parity storage server 5P (may be a plurality thereof instead) can be communicably connected via a communication network 2 such as the Internet.

The backup source server 1 can be communicably connected via fixed wiring or wirelessly to a backup source storage device 3 that is capable of storing backup target data. The backup source server 1 reads out backup target data from the backup source storage device 3 and divides up this backup target data into one or more fragmented data groups. Each fragmented data group contains fragmented data items in a quantity (three, for example) that is the same as that of the backup destination servers 5A to 5C. The backup source server 1 distributes and transfers the three fragmented data items contained in each fragmented data group (called "fragmented backup data items" hereinafter) to three backup destination servers 5A, 5B and 5C.

The backup source storage device 3 is a device capable of storing data to be a target for backup, and is an external or internal hard disk, for example. In this backup source storage device 3, a variety of data is in a predetermined format and managed according to a hierarchical structure such as one in which a second directory exists on a level below a first directory, and one or a plurality of data files is(are) stored in the second directory, for example. Therefore, if the operator designates the first directory as the backup target with respect to the backup source server 1, for example, all the data files existing below the first directory are designated as the backup target.

Each backup destination server, such as the backup destination server 5A, for example, is a server constituting the transfer destination of the fragmented backup data and can be communicably connected to one or a plurality of backup destination storage devices 7A via a communication network such as an SAN (Storage Area Network). The backup destination storage device 7A is a device whereon fragmented backup data items are stored from the backup source server 1 via the backup destination server 5A, such as a magnetic tape library that comprises one or a plurality of magnetic tapes capable of recording these fragmented backup data items, for example. Further, the backup destination storage device 7A is not limited to a magnetic tape library and may instead comprise one or a plurality of hard disks, for example.

The other backup destination servers 5B and 5C have the same functions as the backup destination server 5A. The other backup destination storage devices 7B and 7C are also the same as the backup destination storage device 7A.

The parity storage server 5P is a server that is capable of being communicably connected to one or a plurality of parity storage devices 7P via a communication network such as an SAN (Storage Area Network). The parity storage server 5P accesses the backup destination servers 5A to 5C and acquires three fragmented backup data items contained in each fragmented data group from the servers 5A to 5C, and then stores data in the parity storage device 7P by computing parity data from these three fragmented backup data items (the constitution of the parity storage device 7P is the same as that of the backup destination storage device 7A, for example). Further, the parity data stored in the parity storage device 7P may thus be computed by the parity storage server 5P or may be determined by the backup source server 1. Further, the parity data may be determined individually by any one of the three backup destination servers 5A to 5C, or may be determined collaboratively by two or more servers among the backup destination servers 5A to 5C and the parity storage server 5P.

Figure 2:
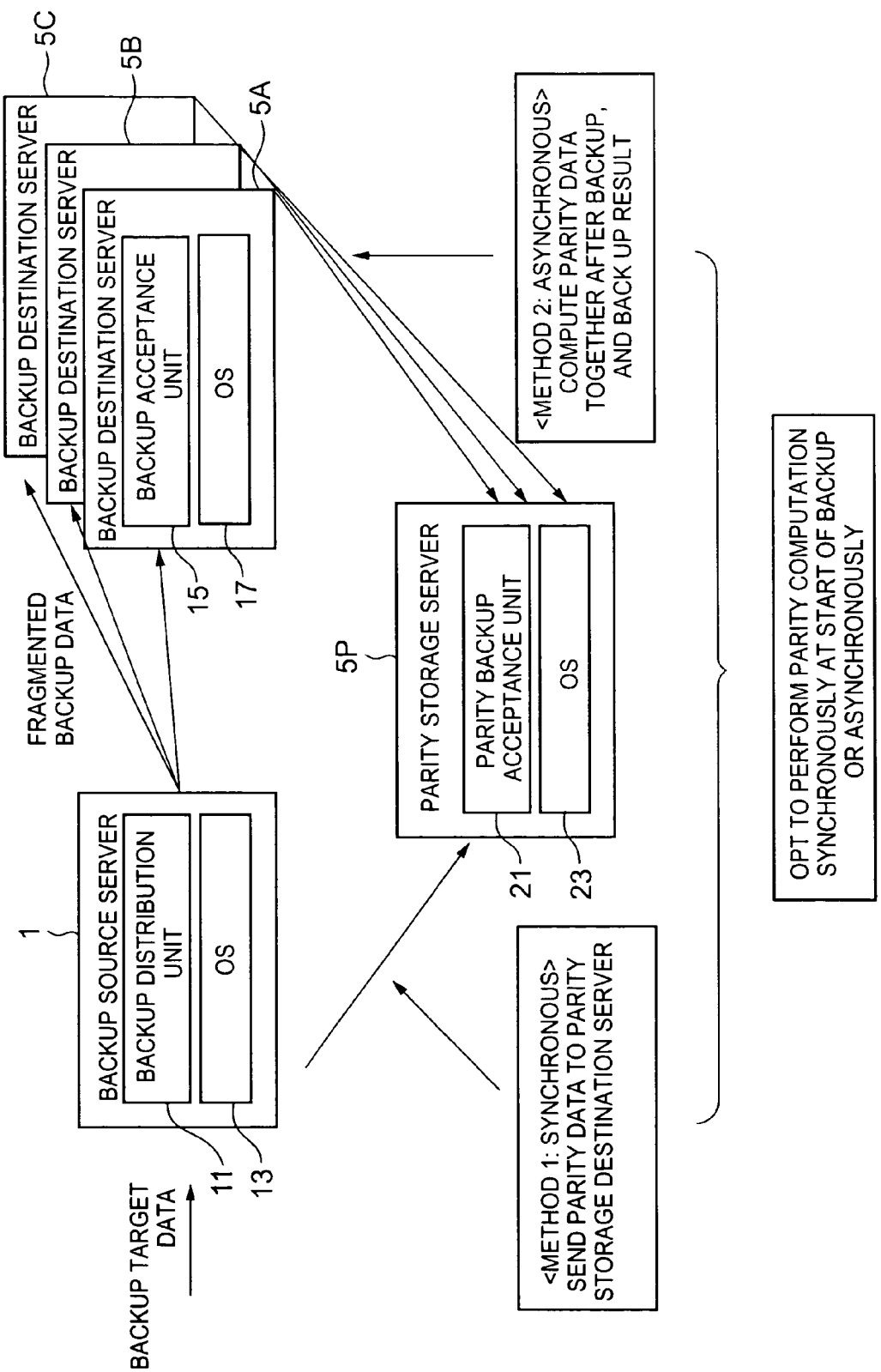
FIG. 2 is a block diagram showing the functions of each server constituting the backup system according to this embodiment.

FIG. 2 is a block diagram showing the functions of each server constituting the backup system according to this embodiment.

The backup source server 1 comprises an operating system (OS) 13 such as the Microsoft Windows (trademark) operating system, and the backup distribution unit 11, which is application software situated above the OS 13. The backup distribution unit 11 has a variety of functions.

For example, the backup distribution unit 11 functions to divide up the backup target data acquired from the backup source storage device 3 into one or more fragmented data groups containing three fragmented backup data items, and to distribute and transfer the three fragmented backup data items contained in each fragmented data group to the three backup destination servers 5A to 5C. More specifically, for example, the backup distribution unit 11 distributes and transfers these three fragmented backup data items to the three backup destination servers 5A to 5C each time three fragmented backup data items are obtained as a result of data being read with a predetermined data size from the backup target data.

Furthermore, the backup distribution unit 11 has a function to select the timing for computing and storing parity data (hereinafter called the "parity computation timing") as "synchronous" or "asynchronous" on the basis of predetermined conditions. More specifically, if the data size of the backup target data that contains one or a plurality of data files is less than a certain value, the backup distribution unit 11 selects "synchronous" as the parity computation timing, for example. On the other hand, if the data size of the backup target data is equal to or more than this certain value, the backup distribution unit 11 selects "asynchronous" as the parity computation timing. When "synchronous" is selected, the backup distribution unit 11 transmits parity data to the parity storage server 5P by computing the parity data on the basis of three fragmented backup data items when three fragmented backup data items are transmitted to the backup destination servers 5A to 5C. On the other hand, when "asynchronous" is selected, after backup target data have been transmitted to the backup destination servers 5A to 5C and the backup has ended, three fragmented backup data items are collected from the backup destination servers 5A to 5C by a server other than the backup source server 1, such as the parity storage server 5P, for example, and each time three fragmented backup data items are collected, parity data is computed on the basis of the three fragmented backup data and this parity data is stored in the parity storage device 7P.

The backup distribution unit 11 also has several other functions. However, these other functions will be described in detail subsequently.

The backup destination server 5A (like 5B and 5C) comprises an operating system (OS) 17 such as a Microsoft Windows (trademark) operating system, and the backup acceptance unit 15, which is application software. The backup acceptance unit 15 has a plurality of functions, such as a function that receives fragmented backup data from the backup source server 1 and stores this data in the backup destination storage device 7A, for example (each backup acceptance unit 15 of the backup destination servers 5A to 5C also has several other functions, but details of the other functions will be described subsequently).

The parity storage server 5P comprises an operating system (OS) 23 such as a Microsoft Windows (trademark) operating system, and the parity backup acceptance unit 21, which is application software. The parity backup acceptance unit 21 has a variety of functions, such as a function that, each time three fragmented backup data items are obtained as a result of receiving fragmented backup data items from each of the backup destination servers 5A to 5C, creates parity data on the basis of these three fragmented backup data items and stores this parity data in the parity storage device 7P, for example (the parity storage device 7P also has several other functions but details of the other functions will be described subsequently).

Therefore, any of the servers 1, 5A to 5C, and 5P may comprise an OS. For this reason, any of the servers 1, 5A to 5C, and 5P can be mounted with a function such as one that calls a predetermined module of the OS and computes parity data from three fragmented backup data items.

A description will be provided below for the backup distribution unit 11, the backup acceptance unit 15, and the parity backup acceptance unit 21.

Figure 3:
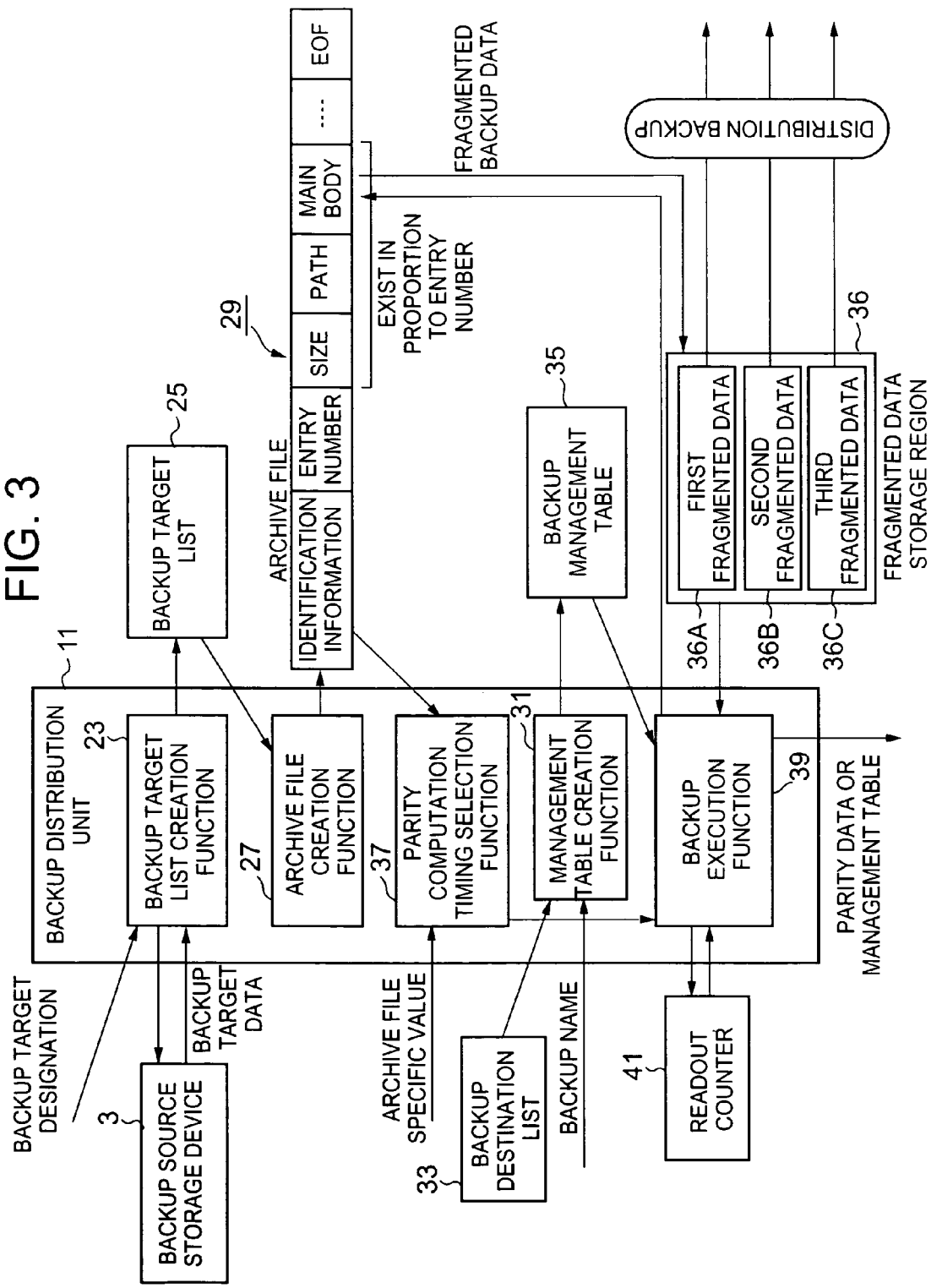
FIG. 3 is a block diagram showing the functions of a backup distribution unit 11 with which the backup source server 1 is equipped.

FIG. 3 is a block diagram showing the functions of the backup distribution unit 11 with which the backup source server 1 is equipped.

The backup distribution unit 11 comprises a backup target list creation function 23, an archive file creation function 27, a parity computation timing selection function 37, a management table creation function 31, and a backup execution function 39.

The backup target list creation function 23 is a function to receive a backup target designation from outside (the operator, for example) and creates a list (hereinafter called the backup target list") 25 that relates to the designated backup target data. More specifically, the backup target list creation function 23 receives a directory (or file) designation from outside, accesses the backup source storage device 3, and reads all the data files that exist in the designated directory (and subdirectories thereof) from the backup source storage device 3. Then, the backup target list creation function 23 creates information relating to all the data files thus read, such as the backup target list 25 that contains the data file path names and file names, for example. The backup target list 25 thus created is stored in a predetermined storage device, for example (one example of which is memory such as RAM within the backup source server 1).

The archive file creation function 27 creates an archive file 29 in which identification information is held, acquires all the data files constituting the backup target on the basis of the information in the backup target list 25 thus created, and stores all the data files in the archive file 29. As a result, as is shown, the archive file 29 contains identification information for the archive file 29, the number of entries of the data files constituting the backup target (that is, the number of data files stored in the archive file 29), the backup target information corresponding to this number of entries (the data size, path, and main body (file itself) of each data file, for example), and EOF (End of File) information that indicates the end of the archive file 29. The archive file 29 is stored in the predetermined storage device.

A parity computation timing selection function 37 receives an input of an archive file specific value from outside (the operator, for example) and compares the data size of the archive file 29 with the archive file specific value thus input. As a result, if the data size of the archive file 29 is equal to or more than the archive file specific value, the parity computation timing selection function 37 selects "asynchronous" as the parity computation timing. On the other hand, when the data size of the archive file 29 is less than the archive file specific value, the parity computation timing selection function 37 selects "synchronous" as the parity computation timing. Further, as is clear from the above description, the archive file specific value is an archive file data size value that serves as a reference when either of "synchronous" and "asynchronous" is selected as the parity computation timing.

The management table creation function 31 creates the backup management table 35 by inputting information such as the backup destination list 33.

Here, as shown in FIG. 4, the backup destination list 33 is a list containing information relating to the backup destination servers 5A to 5C (such as the names of the backup destination servers 5A to 5C as well as location information for these servers, for example), and information relating to the parity storage server 5P (such as the name of the parity storage server 5P as well as location information for this server, for example). The backup destination list 33 inputted to the management table creation function 31 may be input manually by the operator or may be selected from one or a plurality of pre-registered backup destination lists automatically or in accordance with a user operation.

In addition, as shown in FIG. 5, the backup management table (hereinafter simply called the "management table") 35 has a variety of information relating to the backup of the backup target data registered therein. More specifically, registered in the management table 35 are a "backup name" for identifying the backup, the "backup date" on which the backup was performed, and the "number of backup destinations", which indicates the number of backup destination servers, for example. In addition, a "backup destination name", which represents the name of the backup destination server, a "data storage start position", which represents the location where the fragmented backup data was initially stored, and a "backup size", which represents the total data size of the stored fragmented backup data, are registered in the same quantity as the number of backup destinations, that is, for each backup destination server, in the management table 35, for example. In addition, the "name of the parity data storage destination", which represents the name of the parity storage server, the "data storage location", which represents the location where the parity data is stored, and the "parity size", which represents the data size of the stored parity data, are registered, for the parity storage server 5P, in the management table 35, for example.

The management table creation function 31 creates the management table 35 shown in FIG. 5 as detailed below, for example.

In other words, the management table creation function 31 receives an input for the backup name from the outside (the operator, for example) and the backup name thus inputted is entered in the "backup name" field of the management table 35. Further, the management table creation function 31 enters the date on which the backup was performed in the "backup date" field of the management table 35. The management table creation function 31 inputs the backup destination list 33, retrieves the backup destination list 33, and then specifies the number and names of the backup destination servers 5A to 5C and the name and so forth of the parity storage server 5P. Further, the management table creation function 31 enters the number of backup destination servers specified above in the "number of backup destinations" field of the management table 35 and enters the name specified for each of the backup destination servers in the "backup destination name" of the management table 35. Furthermore, the management table creation function 31 enters the name of the parity storage server 5P specified above in the "name of the parity data storage destination" field of the management table 35. In addition, as will be described subsequently, the management table creation function 31 acquires, for each of the backup destination servers, the data storage start position and the total data size of the stored fragmented backup data, enters the acquired data storage start position in the "data storage start position" field of the management table 35 in correspondence with the backup destination server, and enters the acquired data size in the "backup size" field of the management table 35. Likewise, as will be described subsequently, the management table creation function 31 acquires the data storage position, and the data size of the acquired parity data from the parity storage server 5P, enters the data storage position thus acquired in the "data storage position" field of the management table 35, and enters the acquired data size in the "parity size" field of the management table 35.

The backup execution function 39 divides up each backup target file entered in the archive file 29 into one or more fragmented data groups containing three fragmented backup data items, and distributes and transfers the three fragmented backup data items contained in each fragmented data group in three backup destination servers 5A to 5C. More specifically, for example, the backup execution function 39 sets the value of a predetermined counter (referred to hereinafter as the "readout counter") 41 with which the backup source server 1 is equipped to zero, acquires data of a predetermined size (an example of which is 1024 bytes) from the backup target file in the archive file 29, stores this data in a first data region (hereinafter abbreviated to "first region") 36A in the fragmented data storage region 36 in predetermined memory, and sets the value of the readout counter 41 to 1. Next, the backup execution function 39 acquires the next data of a predetermined size from the backup target file, stores this data in a second data region (hereinafter abbreviated to "second region") 36B in the fragmented data storage region 36, and sets the value of the readout counter 41 to 2. Next, the backup execution function 39 acquires the next data of a predetermined size from the backup target file, stores this data in a third data region (hereinafter abbreviated to "third region") 36C in the fragmented data storage region 36, and sets the value of the readout counter 41 to 0. Therefore, three data items of a predetermined size are accumulated as three fragmented backup data items in the fragmented data storage region 36, and the backup execution function 39 distributes and transmits the three accumulated fragmented backup data items in three backup destination servers 5A to 5C. The backup execution function 39 repeats the above processing up to the point where the EOF information of the archive file 29 is detected.

Further, the backup execution function 39 executes predetermined processing in accordance with whether the parity computation timing selected by the parity computation timing selection function 37 is "synchronous" or "asynchronous". More specifically, for example, in a case where "synchronous" is selected, when transmitting three fragmented backup data items to the backup destination servers 5A to 5C, the backup execution function 39 generates parity data from the three fragmented backup data items and transmits this parity data to the parity storage server 5P that possesses the name listed in the management table 35. That is, in a case where "synchronous" is selected, when performing a backup of three fragmented backup data items, the backup execution function 39 executes processing to create and store parity data. On the other hand, in a case where "asynchronous" is selected, the backup execution function 39 transmits the management table 35 to the parity storage server 5P after the whole backup of the backup target files in the archive file 29 has been completed. Accordingly, the parity storage server 5P collects the three fragmented backup data items from the three backup destination servers 5A to 5C by using the management table 35, generates parity data from the three fragmented backup data items, and stores this parity data in the parity storage device 7P. That is, in a case where "asynchronous" is selected, because the backup execution function 39 transmits the management table 35 to the parity storage server 5P, parity data is created and stored by the parity storage server 5P, upon completion of the whole backup of the backup target files.

Figure 6:
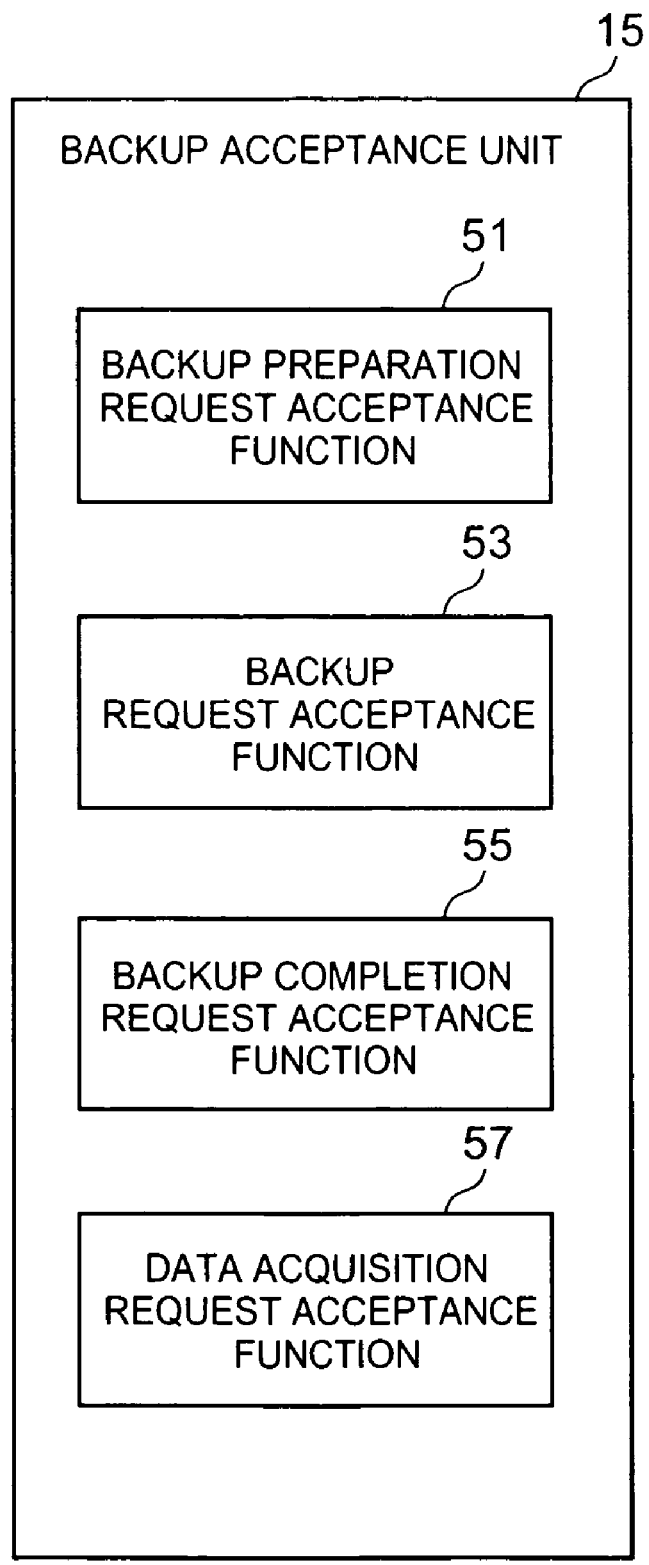
FIG. 6 is a block diagram showing the functions of a backup acceptance unit 15 with which a backup destination server 5A is equipped.

FIG. 6 is a block diagram showing the functions of the backup acceptance unit 15 with which a backup destination server 5A is equipped (the backup acceptance unit with which the backup destination servers 5B and 5C are equipped is also the same).

The backup acceptance unit 15 comprises a backup preparation request acceptance function 51, a backup request acceptance function 53, a backup completion request acceptance function 55, and a data acquisition request acceptance function 57.

The backup preparation request acceptance function 51 receives a backup preparation request from the backup source server 1, and thus issues a request to secure a data storage destination to the backup destination storage device 5A. Once a data storage position is acquired from the backup destination storage device 5A, the backup preparation request acceptance function 51 communicates the data storage position to the backup source server 1.

The backup request acceptance function 53 receives fragmented backup data items from the backup source server 1 and issues a write request for the fragmented backup data items to the backup destination storage device 5A. Further, the backup request acceptance function 53 manages the total size of the write-requested fragmented backup data (called the "write size" hereinafter), and updates the write size each time a write request is issued to the backup destination storage device 5A.

The backup completion request acceptance function 55 receives a backup completion request from the backup source server 1, breaks the connection with the backup destination storage device 7A, and communicates the write size at the time of the backup completion request acceptance (that is, the total data size of the fragmented backup data thus backed up) to the backup source server 1.

The data acquisition request acceptance function 57 receives designation of the data storage position and size from the paging source (the parity storage server 5P, for example), connects to the backup destination storage device 5A that possesses the data storage position, acquires data in a proportion corresponding to the designated size from the data storage position, and transmits this data to the paging source.

Figure 7:
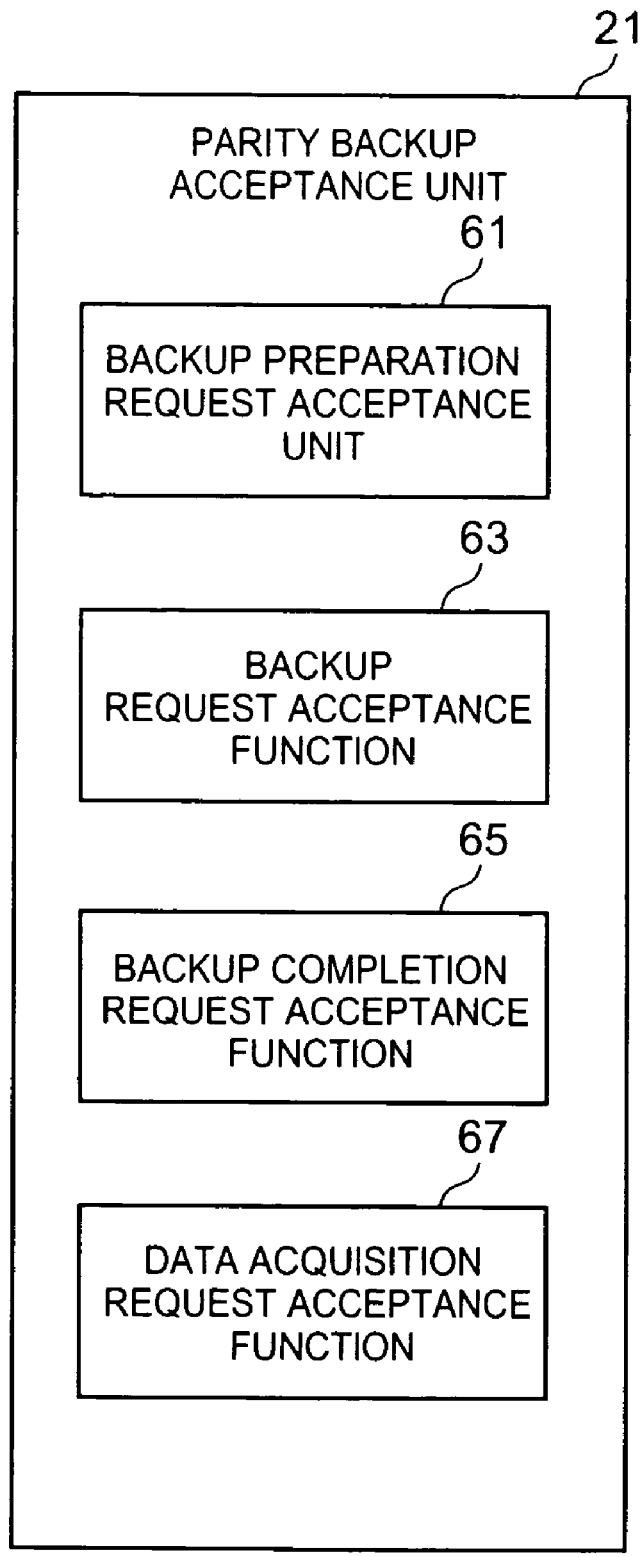
FIG. 7 is a block diagram showing the functions of a parity backup acceptance unit 21 with which a parity storage server 15P is equipped.

FIG. 7 is a block diagram showing the functions of the parity backup acceptance unit 21 with which the parity storage server 15P is equipped.

The parity backup acceptance unit 21 comprises a backup preparation request acceptance function 61, a backup request acceptance function 63, a backup completion request acceptance function 65, and a data acquisition request acceptance function 67.

The backup preparation request acceptance function 61 is the same function as the backup preparation request acceptance function 51 mentioned above.

The backup request acceptance function 63 is the same function as the above-mentioned backup request acceptance function 53 when "synchronous" is selected as the parity computation timing. On the other hand, when "asynchronous" is selected as the parity computation timing, the backup request acceptance function 63 performs the following processing. In other words, the backup request acceptance function 63 inputs the management table 35 (see FIG. 5) that has been received from the backup source server 1, acquires each of the three fragmented backup data items contained in each fragmented data group from the backup destination servers 5A to 5C on the basis of the contents of the management table 35, computes parity data for the three fragmented backup data items, and stores this parity data in the parity storage device 7P.

The backup completion request acceptance function 65 is the same function as the above-mentioned backup completion request acceptance function 55.

Furthermore, the data acquisition request acceptance function 67 is the same function as the above-mentioned data acquisition request acceptance function 57.

The description above is for the functions of the applications 11, 15, and 21. Further, at least the backup distribution unit 11 and the parity backup acceptance unit 21 of the above applications 11, 15, and 21 are capable of computing parity data from three fragmented backup data items. However, the parity data can be determined by means of predetermined numerical processing, such as by means of an exclusive OR (XOR) of the three fragmented backup data items, for example.

Figure 8:
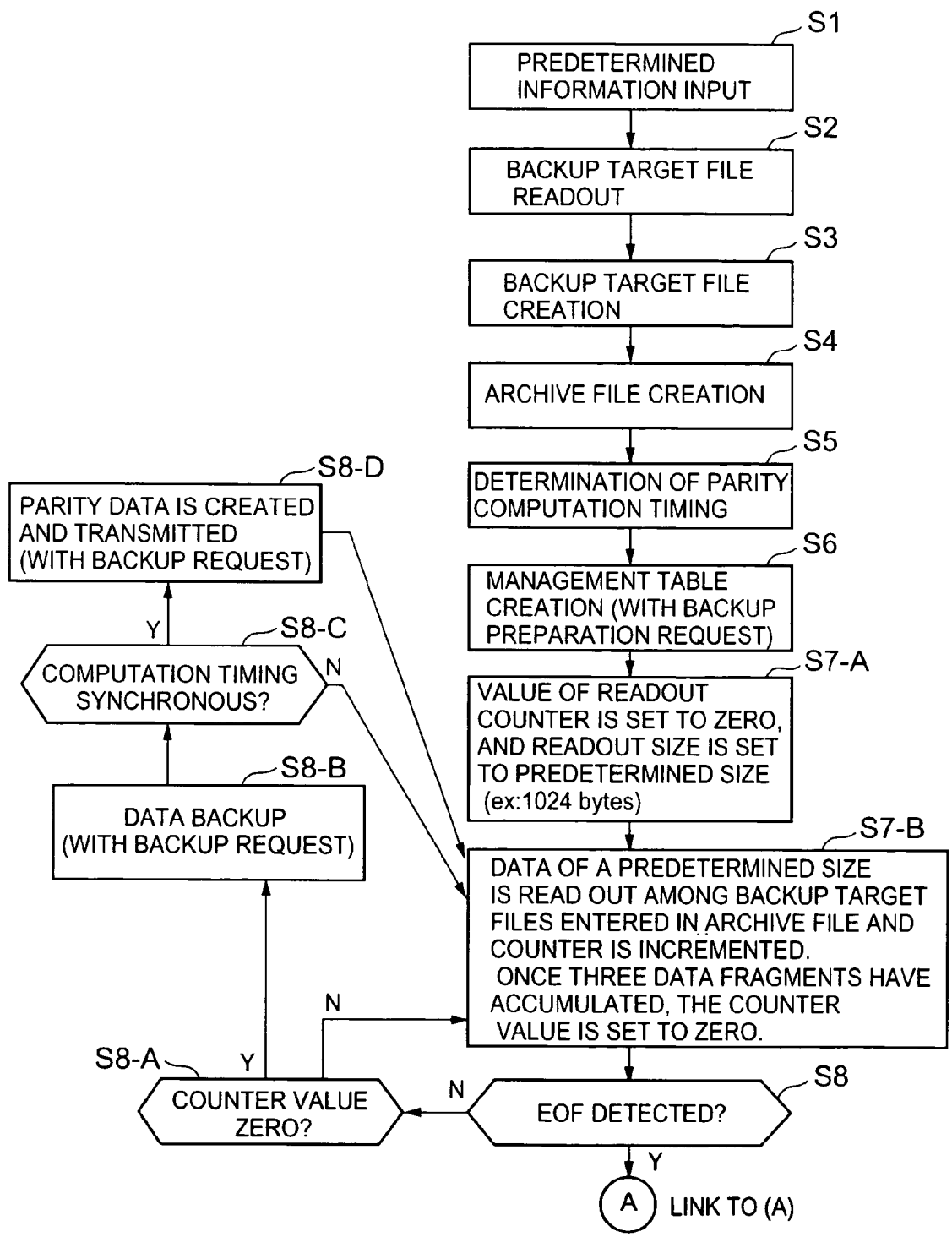
FIG. 8 shows the operational flow of the backup distribution unit 11 with which the backup source server 1 is equipped.

A description will be provided for the operational flow of each of the applications 11, 15, and 21 with which each of the servers 1, 5A to 5B, 5P are equipped, through reference to FIG. 8 and beyond.

Figure 9:
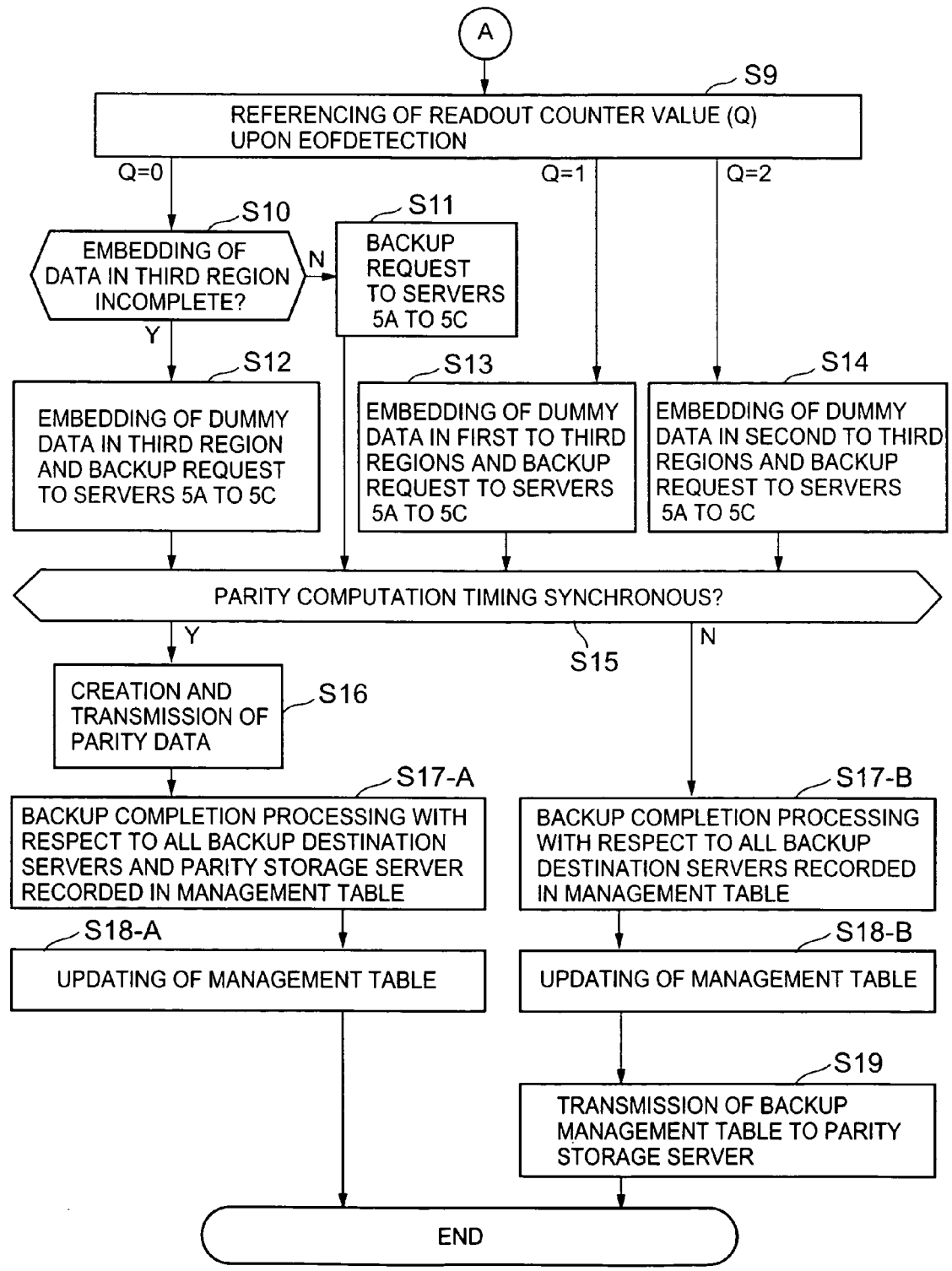
FIG. 9 shows the operational flow of the backup distribution unit 11 with which the backup source server 1 is equipped.

FIGS. 8 and 9 show the operational flow of the backup distribution unit 11 with which the backup source server 1 is equipped.

A backup target directory (or file), a backup name, a backup destination list 33 (see FIG. 4), and the archive file specific value, for example, are input (step S1) to the backup distribution unit 11 as predetermined information. This input information may be inputted manually by the operator or may be manually or automatically selected and read out from among one or a plurality of information items that are pre-registered in a predetermined storage region.

The backup distribution unit 11 reads out all the data files belonging to the inputted backup target directory (S2), and creates the backup target list 25 containing information relating to all the data files (such as the path name and file name of the data file, for example) (S3).

Next, the backup distribution unit 11 newly creates the archive file 29 (see FIG. 3) (S4), acquires all the data files (hereinafter called "backup target files") read out in S2 on the basis of the backup target list 25 created in S3, and stores all the backup target files in the archive file 29 created in S4.

Next, the backup distribution unit 11 compares the archive file 29, in which all the backup target files are stored, with the archive file specific values inputted in S1. If the result of this comparison is that, the data size of the archive file 29 is equal to or more than the archive file specific value, the backup distribution unit 11 selects "asynchronous". If, on the other hand, the data size of the archive file 29 is less than the archive file specific value, the backup distribution unit 11 selects "synchronous" (S5).

Next, the backup distribution unit 11 creates the management table 35 (see FIG. 5) (S6).

More specifically, the backup distribution unit 11 registers the backup name inputted in S1, and the date on which the operation was performed (that is, the backup date) in the management table 35. Furthermore, the backup distribution unit 11 retrieves the backup destination list 33 inputted in S1, acquires the name (host name) of the backup destination servers 5A to 5C, and then issues a backup preparation request to the backup 10 destination servers 5A to 5C. As a result, the operation of S21 in FIG. 11 (described later) begins and the backup distribution unit 11 accordingly receives a communication regarding the data storage start position, which is the position in which the fragmented backup data is first stored, from the backup destination servers 5A to 5C. The backup distribution unit 11 then registers the number of the backup destination servers 5A to 5C in the management table 35, and, for each backup destination server, sets the acquired host name and the communicated data storage start position in the management table 35.

Furthermore, the backup distribution unit 11 acquires the name (host name) of the parity storage server 5P from the backup destination list 33 inputted in S1 and issues a backup preparation request to the parity storage server 5P. Accordingly, the backup distribution unit 11 receives a communication regarding the data storage position, which is the position in which the parity data is stored, from the parity storage server 5P. The backup distribution unit 11 then sets the acquired host name and the communicated data storage position in the management table 35 with respect to the parity storage server.

Then the backup distribution unit 11 sets the value of the readout counter 41 to zero, and sets a unit of the data read out from the backup target file in the archive file 29 at a predetermined size (1024 bytes, for example) (S7-A). Next, the backup distribution unit 11 reads out the backup target files entered in the archive file 29 in units of the predetermined size set above. The backup distribution unit 11 increments the value of the readout counter 41 by one each time data of the predetermined size is read out. Further, when data of the predetermined size is read out, the backup distribution unit 11 sets the counter to zero once three data fragments have accumulated (S7-B).

Here, if the EOF information is not detected (N in S8) when the backup distribution unit 11 reads out data of a predetermined size and the value of the readout counter 41 is not zero (N in S8-A), this constitutes a state where three fragmented backup data items have not accumulated in the fragmented data storage region 36 (see FIG. 3). Until this state is assumed, the reading out of data in units of a predetermined size is repeated and the counting continues. Then once three data fragments have accumulated, the backup distribution unit 11 resets the counter to zero (S7-B).

Further, if EOF information is not detected (N in S8) and the value of the readout counter 41 is zero (Y in S8-A), this constitutes a state where three fragmented backup data items have accumulated in the fragmented data storage region 36, and hence the backup distribution unit 111 executes the following processing.

In other words, the backup distribution unit 11 issues a backup request to the backup destination server 5A for fragmented backup data that is stored in the first region 36A. The backup distribution unit 11 then transmits this data to the server 5A, issues a backup request to the backup destination server 5B for fragmented backup data stored in the second region 36B and transmits this data to the server 5B, and then issues a backup request to the backup destination server 5C for fragmented backup data stored in a third region 36C and then transmits this data to the server 5C (S8-B).

Further, if "asynchronous" is selected (N in S8-C) as the parity computation timing in S5, the backup distribution unit 11 performs the operation in S7-B once again.

On the other hand, if "synchronous" (Y in S8-C) is selected in S5, the backup distribution unit 11 computes parity data for three fragmented backup data items in the fragmented data storage region 36 by using these three fragmented backup data items, issues a backup request to the parity storage server 5P for the parity data, and then transmits this parity data to the server 5P (S8-D).

Figure 10:
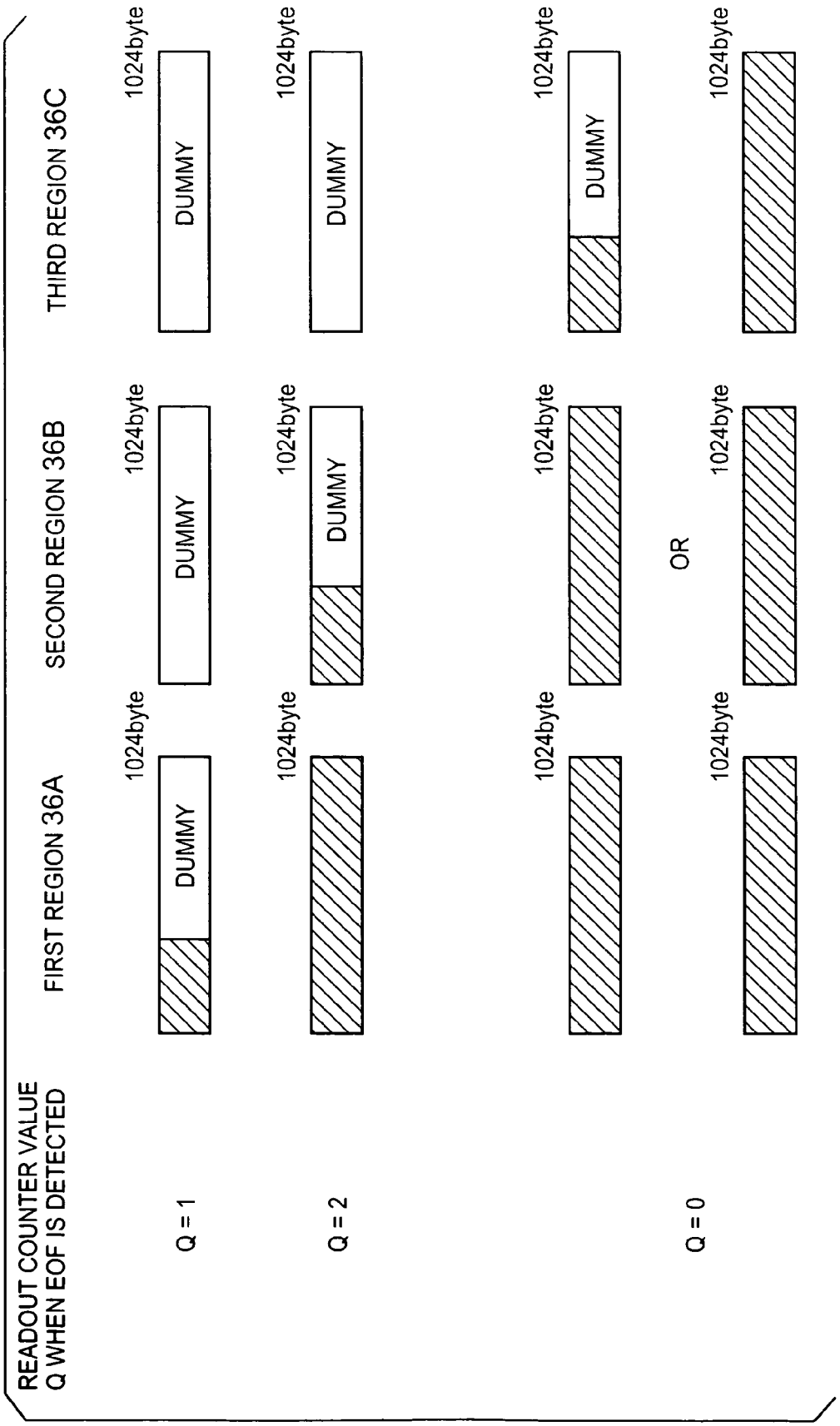
FIG. 10 shows the relationship between the value of the readout counter 41 when EOF information is detected, and the data storage condition of first to third regions 36A to 36C respectively in a fragmented data storage region 36.

In a case where EOF information is detected (Y in S8) when data of a predetermined size is read in S7-B, the backup distribution unit 11 references the value of the readout counter 41 at this time (S9), as shown in FIG. 9. The relationship between the value of the readout counter 41 when EOF information is detected and the data storage condition of the first to third regions 36A to 36C respectively in the fragmented data storage region 36 are as shown in FIG. 10. Each of the first to third regions 36A to 36C respectively is set to a predetermined size that is the same as the data read out from the archive file 29 by the backup distribution unit 11, for example (1024 bytes, for example).

The backup distribution unit 111 performs the following operations in accordance with the value of the readout counter 41 when EOF information is detected.

(1) A case where the value of the readout counter 41 when EOF information is detected is zero.

In this case, the data is embedded in all of the first to third regions 36A to 36C respectively or the embedding of data is incomplete in only the third region 36C.

When data is embedded in all the first to third regions 36A to 36C respectively (N in S10), the backup distribution unit 11 issues a backup request to the backup destination servers 5A to 5C, and transmits the data in the first to third regions 36A to 36C to the backup destination servers 5A to 5C (S11).

On the other hand, when the embedding of data is incomplete in only the third region 36C (Y in S10), after the backup distribution unit 11 has embedded dummy data (null data all represented 0, for example) in an empty part of the third region 36C as shown in FIG. 10, the backup distribution unit 11 issues a backup request to the backup destination servers 5A to 5C and transmits data in the first to third regions 36A to 36C to the backup destination servers 5A to 5C (S12).

(2) A case where the value of the readout counter 41 upon detection of EOF information is 1.

In this case, the embedding of data in the first region 36A is incomplete and no data is embedded in the other regions 36B and 36C.

Here, after embedding dummy data in the empty part of the first to third regions 36A to 36C respectively as shown in FIG. 10, the backup distribution unit 11 issues a backup request to the backup destination servers 5A to 5C and transmits the data in the first to third regions 36A to 36C to the backup destination servers 5A to 5C (S13).

(3) A case where the value of the readout counter 41 upon detection of EOF information is 2.

In this case, data is completely embedded in the first region 36A, the embedding of data in the second region 36B is incomplete, and no data is embedded in the third region 36C.

In this case, after embedding dummy data in an empty part of the second and third regions 36B to 36C as shown in FIG. 10, the backup distribution unit 11 issues a backup request to the backup destination servers 5A to 5C and transmits data in the first to third regions 36A to 36C to the backup destination servers 5A to 5C (S14).

As a result of the processing of S12 to S14, even when the embedding of data in any one of the first to third regions 36A to 36C is incomplete, since dummy data is embedded in the parts with a data shortage, three data items transmitted to backup destination servers 5A to 5C are all of the same data size (the 1024 bytes set in S7-A of FIG. 8, for example).

Further, after S11 to S14 are complete, in a case where "synchronous" has been selected as the parity computation timing (Y in S15), the backup distribution unit 11 generates parity data by using the three fragmented backup data items, issues a backup request to the parity storage server 5P, and transmits the parity data to the server 5P (S116). Thereafter, the backup distribution unit 11 issues a backup completion request to all the backup destination servers 5A to 5C and the parity storage server 5P recorded in the management table 35, and receives a communication on the total size of all the data stored by the servers (that is, the backup size or parity size) from each of the servers 5A to 5C and 5P by way of response (S17-A). The backup distribution unit 11 then registers the backup size, parity size, and so forth, which have been communicated, in the management table 35 (S18-A).

When, on the other hand, "asynchronous" is selected (N in S15) as the parity computation timing after S11 to S14, the backup distribution unit 11 issues a backup completion request to all the backup destination servers 5A to 5C recorded in the management table 35, and then receives a communication regarding the total size of all the data stored by the servers (that is, the backup size) from each of the servers 5A to 5C by way of response (S17-B). The backup distribution unit 11 then registers the backup size, parity size, and so forth, which have been communicated, in the management table 35 and updates the management table 35 (S18-B). Thereafter, the backup distribution unit 11 transmits the updated management table 35 to the parity storage server 5P contained in the management table 35 (S19).

The above description was for the operational flow of the backup distribution unit 11. Next, the operational flow of the backup acceptance unit 15 with which the backup destination server 5A (as per 5B and 5C) is equipped will be described.

Figure 11:
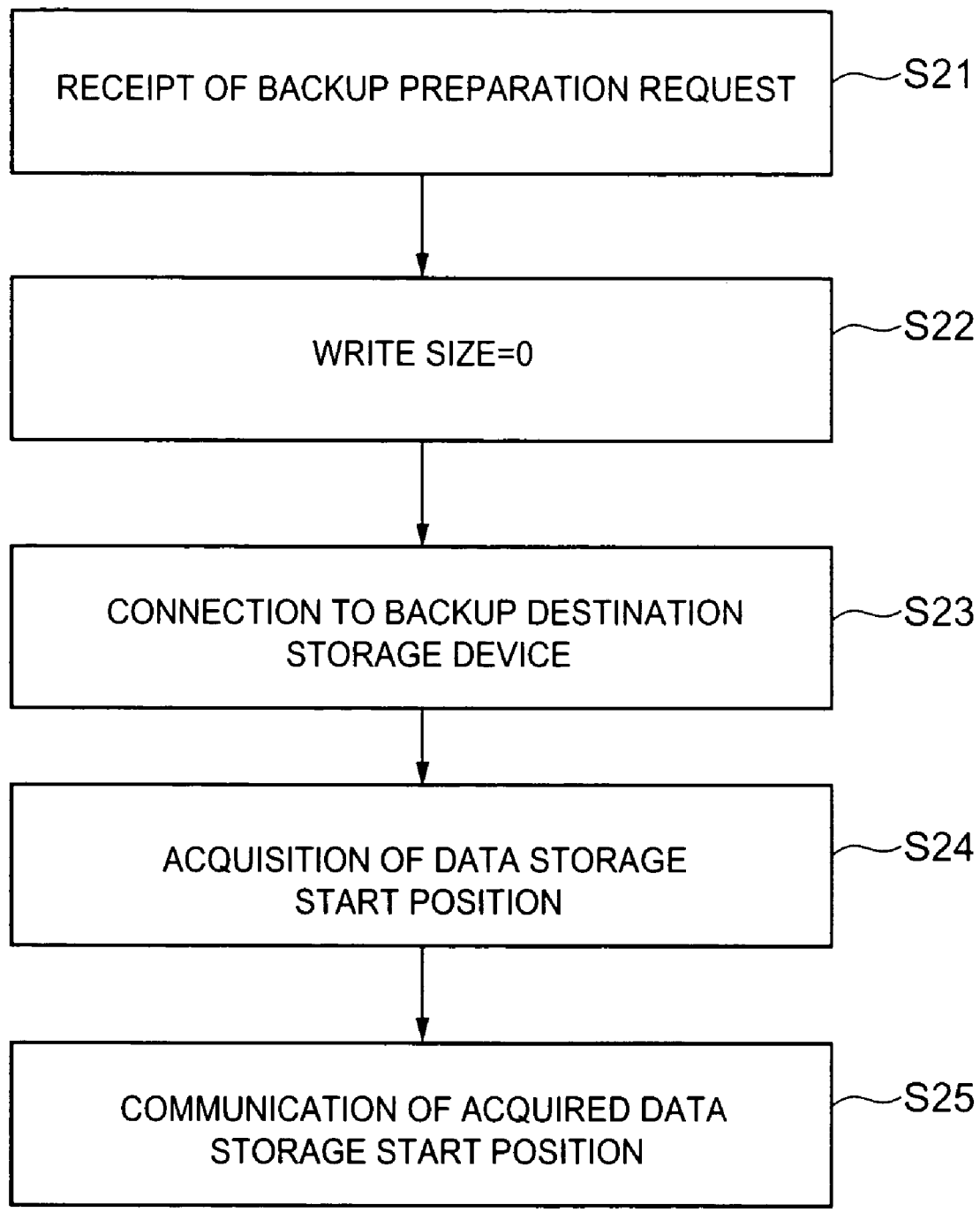
FIG. 11 shows the operational flow of the backup preparation request acceptance function 51 in the backup acceptance unit 15.

FIG. 11 shows the operational flow for the backup preparation request acceptance function 51 of the backup acceptance unit 15.

When, according to the operation of S6 in FIG. 8, a backup preparation request is received from the backup distribution unit 11 of the backup source server 1 (S21), the backup acceptance unit 15 sets the "write size" representing the total size of the fragmented backup data written to the backup destination storage device 7A to zero (S22).

Next, the backup acceptance unit 15 communicably connects the backup destination server 5A and the backup destination storage device 7A (S23), issues a request to the backup destination storage device 7A constituting the connection destination to secure a data storage destination, and acquires a data storage start position indicating an initial data storage position (S24) from the backup destination storage device 7A by way of response. The backup acceptance unit 15 then communicates the data storage start position thus acquired to the backup distribution unit 11 of the backup source server 1 (S25). As a result, the data storage start position is entered in the management table 35 by the backup distribution unit 11 as mentioned earlier.

Figure 12:
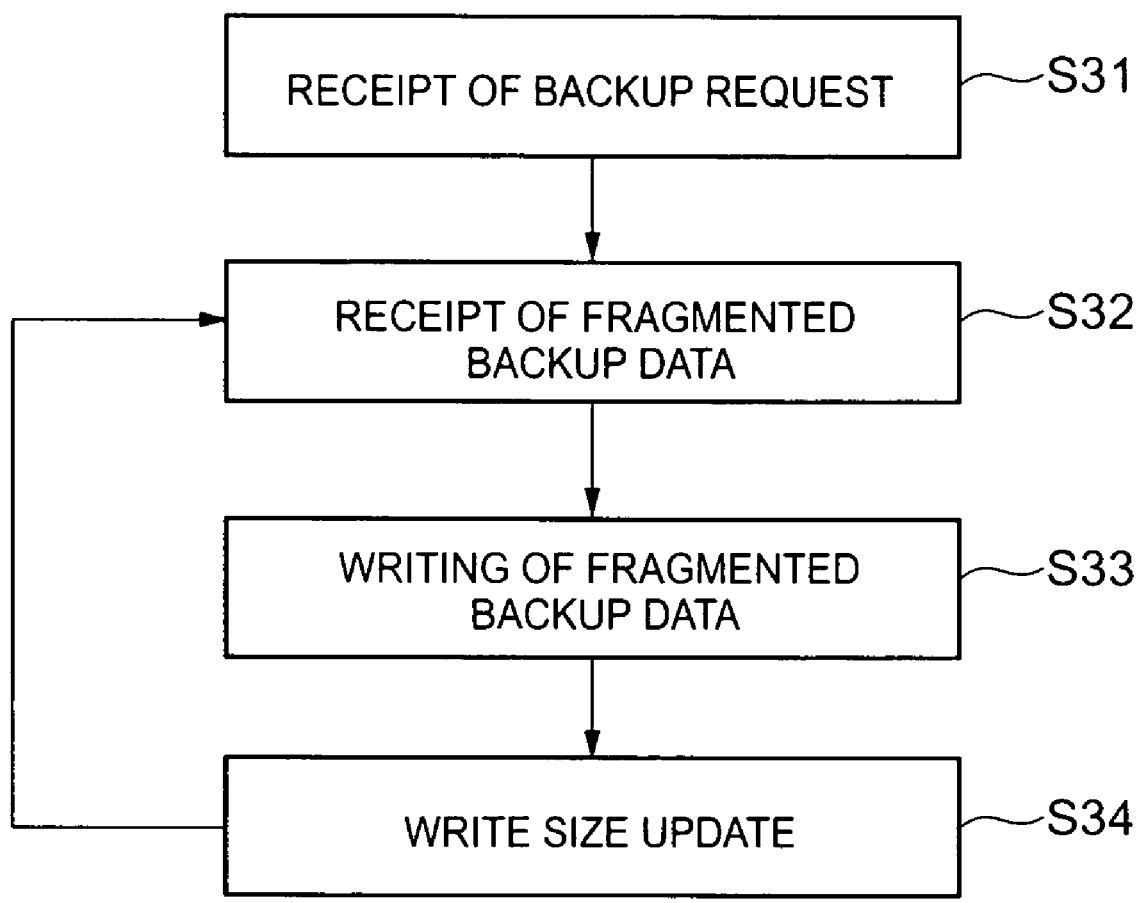
FIG. 12 shows the operational flow of the backup request acceptance function 53 in the backup acceptance unit 15.

FIG. 12 shows the operational flow of the backup request acceptance function 53 of the backup acceptance unit 15.

When the backup request is received from the backup distribution unit 11 of the backup source server 1 due to the operation of S8-B of FIG. 8 (S31), the backup acceptance unit 15 also receives fragmented backup data (S32). Accordingly, the backup acceptance unit 15 writes fragmented backup data to the connected backup destination storage device 7A (S33), and increases the value of the write size by an amount corresponding to the data size of the fragmented backup data (S34). Stated differently, whenever the backup acceptance unit 15 also receives fragmented backup data, the backup acceptance unit 15 repeats the operation of S32 to S34 until a backup completion request arrives from the backup source server 1.

Figure 13:
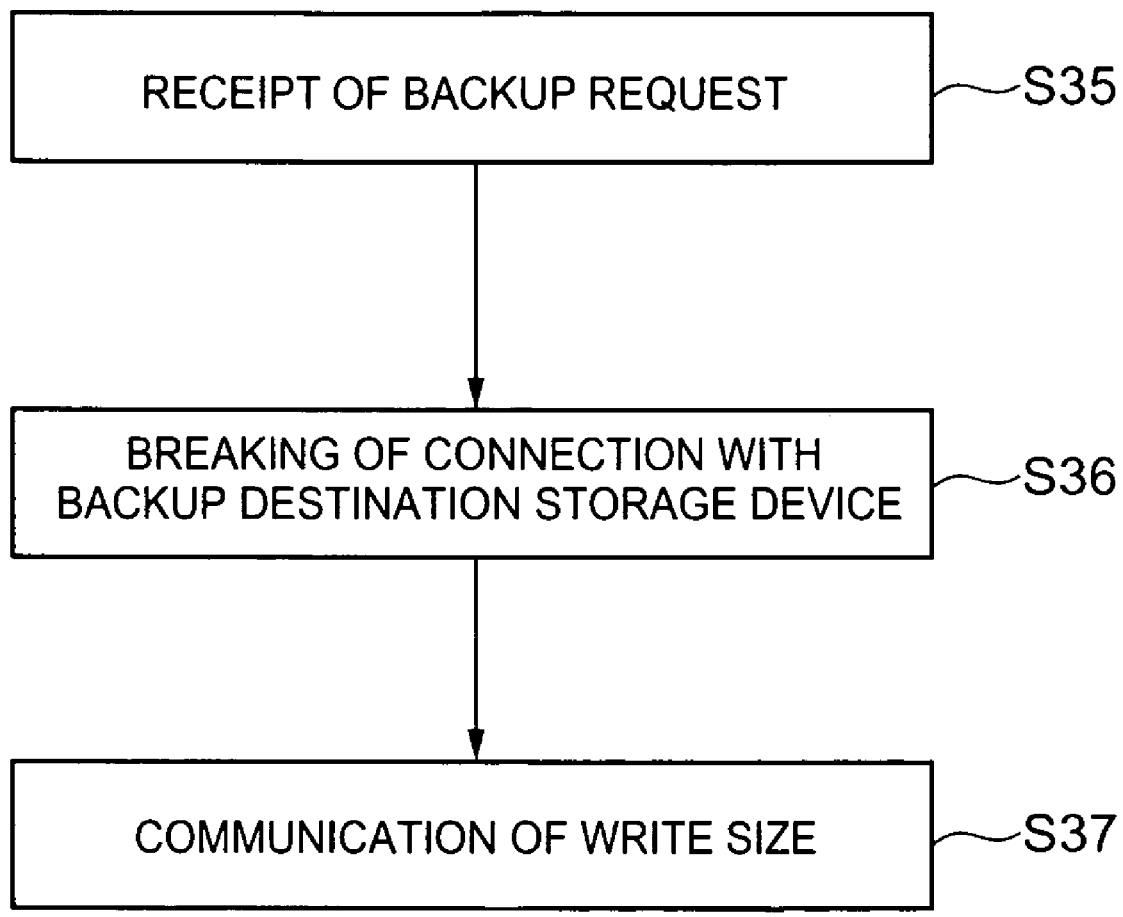
FIG. 13 shows the operational flow of the backup completion request acceptance function 55.

FIG. 13 shows the operational flow of the backup completion request acceptance function 55 of the backup acceptance unit 15.

Upon receiving a backup completion request (S35), the backup acceptance unit 15 breaks the connection between the backup destination server 5A and the backup destination storage device 7A (S36) and communicates the write size at this time, that is, the total data size of the fragmented backup data stored in the backup destination storage device 7A (that is, the backup size) to the backup distribution unit 11 of the backup source server 1 (S37). As a result, the write size (backup size) is entered in the management table 35 by the backup distribution unit 11 as mentioned earlier.

Figure 14:
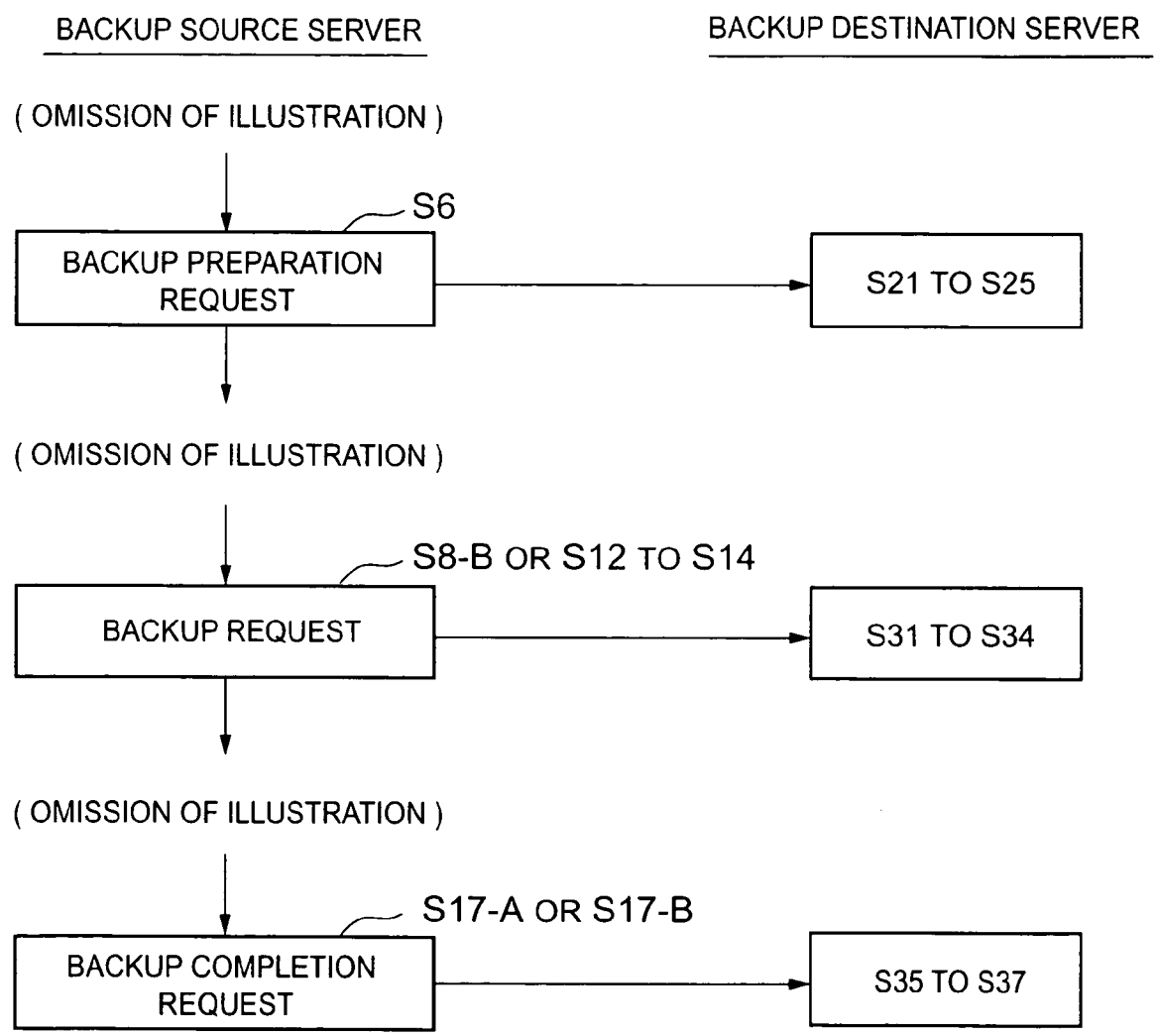
FIG. 14 shows an outline of communication between the backup source server 1 and backup destination servers 5A to 5C.

The above description is summarized in FIG. 14. That is, if the backup acceptance unit 15 receives a backup preparation request from a backup destination server when the backup acceptance unit 15 is in any kind of request wait state, S21 to S25 are executed; if a backup request is received, S31 to S34 are executed; and, if a backup completion request is received, steps S35 to S37 are executed.

Figure 15:
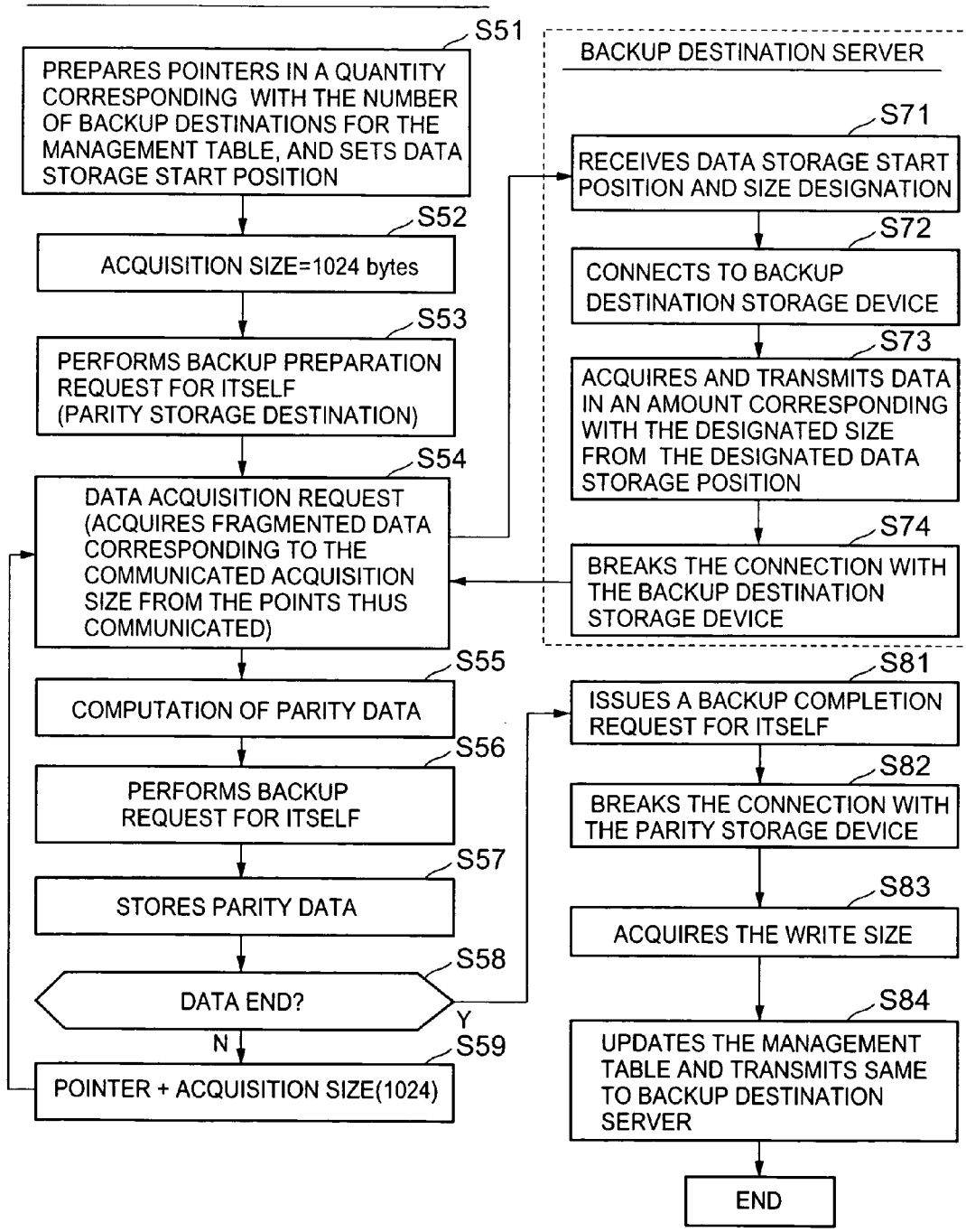
FIG. 15 shows the flow of parity data storage processing in a case where "asynchronous" is selected as the parity computation timing.

FIG. 15 shows the flow of parity data storage processing in a case where "asynchronous" is selected as the parity computation timing. The operational flow of the data acquisition request acceptance function 57 of the backup acceptance unit 15 and the functions of the parity backup acceptance unit 21 when "asynchronous" is selected are described below with reference to FIG. 15.

After the management table 35 has been inputted by the backup source server 1, the parity backup acceptance unit 21 prepares pointers (data positions) in a quantity corresponding to the quantity of backup destinations recorded in the management table 35, as shown in FIG. 15, and data storage start positions of the backup destination servers 5A to 5C recorded in the management table 35 are set for each of the pointers (S51).

Next, the parity backup acceptance unit 21 sets the data acquisition size (readout size) to a predetermined size, such as 1024 bytes, which is the same size as the data size of the fragmented backup data, for example (S52).

Next, the parity backup acceptance unit 21 issues a backup preparation request for itself (S53). More specifically, the parity backup acceptance unit 21 sets the "write size" representing the total size of the fragmented backup data written to the backup destination storage device 7A to zero. The parity backup acceptance unit 21 then communicably connects the parity storage server 5P and the parity storage device 7P, issues a request to secure a data storage destination to the parity storage device 7P constituting the connection destination, and acquires a data storage start position (hereinafter the "parity storage start position"), which indicates the initial data storage position, from the parity storage device 7P by way of response.

Next, the parity backup acceptance unit 21 issues a data acquisition request to each of the backup destination servers 5A to 5C recorded in the management table 35 (S54). More specifically, the parity backup acceptance unit 21 issues a communication regarding the pointers prepared for the backup destination servers (that is, the data storage start positions constituting the data readout start positions) and regarding the acquisition size set in S52 to the backup destination servers 5A to 5C. The following processing is performed by the backup acceptance unit 15 of each of the backup destination servers 5A to 5C.

Upon receiving a designation regarding the data storage start position and the data size from the parity backup acceptance unit 21 (S71), the respective backup request acceptance units 15 of backup destination servers 5A to 5C connect to the backup destination storage devices 7A to 7C respectively (S72).

Further, the backup acceptance unit 15 acquires data (that is, fragmented backup data), in an amount corresponding to the data size designated in S71, from the data storage start position designated in S71, and transmits this data to the parity storage server 5P (S73). Thereafter, the backup acceptance unit 15 breaks the connection with the backup destination storage devices 7A to 7C (S74).

Via S71 to S74, the parity backup acceptance unit 21 acquires data, that is, fragmented backup data, in an amount that corresponds to the acquisition size acquired in S52, from the pointers (data storage start positions) acquired for the backup destination servers 5A to 5C. Accordingly, three fragmented backup data items are acquired from three backup destination servers 5A to 5C. The parity backup acceptance unit 21 then computes parity data by using the three fragmented backup data items thus acquired (S55).

Next, the parity backup acceptance unit 21 issues a backup request for itself (S56) and communicably connects the parity storage server 5P and parity storage device 7P. The parity backup acceptance unit 21 then stores the parity data computed in S55 in the parity storage device 7P (S57).

Thereafter, if the fragmented data acquired from the backup destination servers 5A to 5C is not end data of the acquired target data (N in S58), the parity backup acceptance unit 21 increments the current pointers for the backup destination servers 5A to 5C by an amount corresponding to the acquisition size set in S52 (S59), and then returns to the processing of S54.

If, on the other hand, the fragmented data acquired from the backup destination servers 5A to 5C is end data of the acquired target data (Y in S58), the parity backup acceptance unit 21 issues a backup completion request for itself (S81) and breaks the connection between the parity storage server 5P and the parity storage device 7P (S82). The parity backup acceptance unit 21 then acquires the write size at this point in time, that is, the total data size of the fragmented backup data stored in the parity storage device 7P (S83). Thereafter, the parity backup acceptance unit 21 updates the management table by writing the acquired total data size (parity size), the parity data storage position, and so forth, to the management table, and transmits the updated management table to the backup source server 1 (S84).

The above description was for the flow of asynchronous parity data storage processing.

Further, in the above flow, the parity backup acceptance unit 21 is able to judge whether the acquired fragmented data is end data by judging whether there is a match between the total of the fragmented data acquired from the backup destination servers 5A to 5C, and the backup size written in the management table. Alternatively, the parity storage server 5P communicates the backup size of the backup destination servers 5A to 5C recorded in the management table 35 to the backup destination servers 5A to 5C, and each time the servers 5A to 5C acquire data in an amount corresponding to a designated size from the backup destination storage devices 7A to 7C, the parity storage server 5P counts the total data size of the acquired fragmented data. When the count value is the same as the communicated backup size, the parity backup acceptance unit 21 may make the distinction that the acquired fragmented data is end data by making a communication to the parity storage server 5P by specifying the data acquired at this time as end data.

Furthermore, with the exception of the processing performed in the event of "asynchronous" timing, the operational flow of the parity backup acceptance unit 21 is substantially the same as the operational flow of the backup acceptance unit 21 above (the differences being slight such as the fact that the written data is not fragmented backup data but instead parity data for the operation of the backup request acceptance function shown in FIG. 12, for example).

Figure 16:
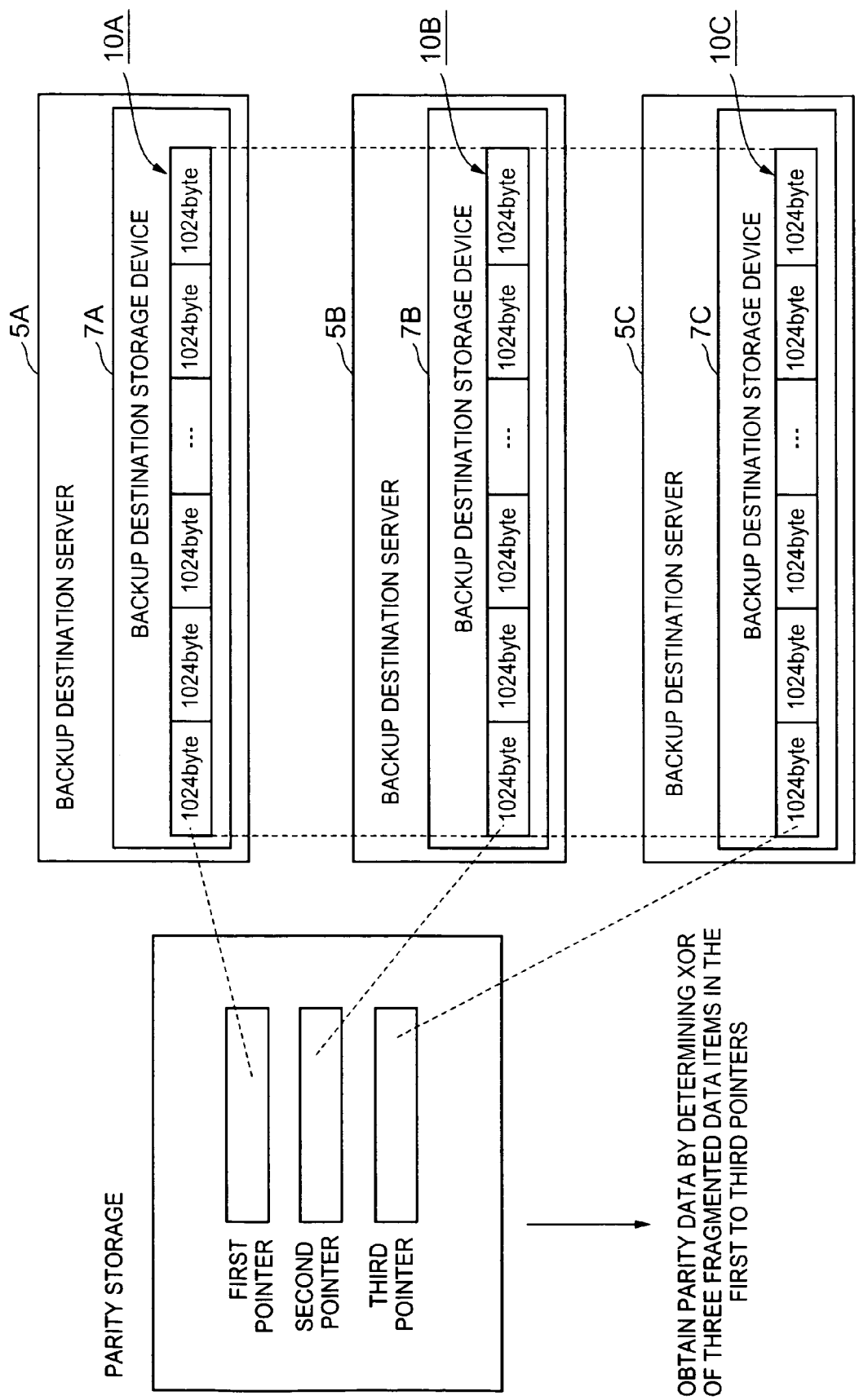
FIG. 16 shows the content of the processing when parity data is computed by obtaining data from the backup destination storage devices 7A to 7C of the backup destination servers 5A to 5C.

Further, in the operational flow above, although data is acquired in units of the acquisition size set in S52, that is, in units of the same data size as the data size for the fragmented backup data, when fragmented backup data are stored in the backup destination servers 5A to 5C, a backup is performed for data with a predetermined size (1024 bytes, for example) by embedding dummy data, as described with reference to FIG. 10. Data can therefore be compulsorily acquired in units of the acquisition size set in S52 (1024 bytes, for example). Stated differently, fragmented backup data items with an equal data size are stored in the same quantity in each of the backup destination storage devices 7A to 7C of the backup destination servers 5A to 5C as shown in FIG. 16. As a result, if the fragmented data thus acquired from the server 5A is end data, for example, the fragmented data acquired from the other servers 5B and 5C are also end data.

According to the embodiment above, the data size of the archive file 29 and the specific value of the archive file inputted from the outside are compared. If the data size of the archive file 29 is equal to or more than the archive file specific value, "asynchronous" is selected as the parity computation timing, whereas, if the data size of the archive file 29 is less than the archive file specific value, "synchronous" is selected as the parity computation timing. Accordingly, computation and storage of parity data can be performed without burdening the backup source server 1 irrespective of the size of the backup target data. That is, parity data can be computed and stored efficiently.

Although the preferred embodiments of the present invention have been described above, such embodiments are examples serving to illustrate the present invention, there being no intention to restrict the scope of the present invention to these embodiments alone. The present invention can also be implemented by means of a variety of other embodiments.

For example, the servers 1, 5A to 5C, and 5P may be a single machine or a system comprising a plurality of machines.

In addition, a plurality of the parity storage server 5P may be provided, for example, and a plurality of parity data items may be distributed and stored in the plurality of parity storage servers 5P respectively.

Furthermore, rather than providing the parity storage server 5P, at least one backup destination server may store parity data in the backup destination storage device connected to the backup destination server, for example.

Further, parity data may be determined by way of collaboration between at least two or more of the servers 5A to 5C and 5P, for example. As a specific example, when parity data is computed by using first to third fragmented data items, the server 5B may acquire the first fragmented data item from the server 5A and compute subparity data by using the first fragmented data and the second fragmented data item that is stored in the backup destination storage device 5B. The server 5C may acquire this subparity data from the server 5B and then compute parity data by using this subparity data and the third fragmented data item stored in the backup destination storage device 5C.

Further, although the embodiment above represents IPSAN, for example, in which data is transferred in block units, the present invention can also be applied to NAS (Network Attached Storage) in which data is transferred in file units.

Moreover, when parity data are computed with the "asynchronous" timing above, the computation of the parity data may be started immediately when the management table 35 is input to the parity management server, or may be started automatically once the backup source server 1 has instructed the parity storage server 5P regarding the start time of the parity data computation and this time is reached (this time may be listed in the management table 35 by the backup source server 1), or may be automatically started with optional timing by the server 5P after the management table 35 has been inputted.

Further, the parity computation timing may be selected on the basis of conditions other than the size of the archive file (hereinafter called the "selected condition"), i.e. at least one condition among the attributes of the backup target data (information written as meta data, for example), the state of communication traffic between the backup source server 1 and the parity storage server 5P, and the data processing condition (CPU usage rate, for example) of the backup source server 1. As a specific example, based on the attributes of the backup target data (meta data, for example), if the data is important, "synchronous" may be selected, and if unimportant, "synchronous" may be selected. As another specific example, if the communication traffic between the backup source server 1 and parity storage server 5P is complex, "asynchronous" may be selected, and if not complex, "synchronous" may be selected. As yet another specific example, if the CPU usage rate, for example, in the data processing condition of the backup source server 1 is high, "asynchronous" may be selected, and if not high, "synchronous" may be selected.

Moreover, the priority ranking of the parity computation timing is set for each of two or more selected conditions (this priority ranking may be fixed or may be freely changed by the operator) and may be selected based on the priority ranking. For example, in a case where "synchronous" is selected because the backup target data is important, when the data size has a higher priority ranking than the attributes of the backup target data as a selection condition, if the data size of this data is enormous, "asynchronous" is selected as the parity computation timing.

What is claimed is:

1. A backup system, comprising:
a backup destination storage device, which is the backup destination of backup target data to be a target for backup;
a backup source device that comprises a backup execution module to back up the backup target data by transferring the backup target data to the backup destination storage device;
an additional information storage medium configured to store additional information created on the basis of the backup target data; and
an additional information creation module to create additional information on the basis of the backup target data after a backup of the backup target data has been completed and then store the additional information in the additional information storage medium;
wherein the backup source device further comprises:
a timing selection module, which selects, on the basis of predetermined conditions, either one of synchronous timing for creating the additional information when the backup is performed or asynchronous timing for creating the additional information after the backup has been performed, as the timing for creating the additional information; and
a synchronous-type additional information creation module, which, when the synchronous timing is selected, creates the additional information when the backup is performed and stores this additional information in the additional information storage medium.

2. The backup system according to claim 1, wherein the additional information creation module is provided in a device separate from the backup source device.

3. The backup system according to claim 1, wherein the backup source device further comprises a generation data transmission module to transmit additional information generation data required in order to generate additional information to the additional information creation module; and
the additional information creation module is configured to receive the additional information generation data, generate the additional information by using the additional information generation data, and store the generated additional information in the additional information storage medium.

4. The backup system according to claim 1, wherein the timing selection module selects either the synchronous timing or the asynchronous timing on the basis of at least one of the predetermined conditions, the predetermined conditions being the data size of the backup target data, the state of communication traffic between the backup source device and the additional information creation module, attributes of the backup target data, and the condition of the data processing in the backup source device.

5. The backup system according to claim 1, wherein a plurality of the backup destination storage device exists;
the backup execution module divides up the backup target data into one or more fragmented data groups containing a plurality of fragmented data items, and distributes and transmits a plurality of fragmented data items contained in the divided fragmented data groups to the plurality of backup destination storage devices respectively;
the additional information creation module acquires the plurality of respective fragmented data items from the plurality of backup destination storage devices for each of the fragmented data groups, and creates the additional information by using the acquired plurality of fragmented data items.

6. The backup system according to claim 1, wherein a plurality of the backup destination storage device exists;
the backup execution module divides up the backup target data into one or more fragmented data groups containing a plurality of fragmented data items, distributes and transmits a plurality of fragmented data items contained in the divided fragmented data groups to the plurality of backup destination storage devices respectively, writes store destination of each fragmented data item included in each divided fragmented data group, and transmits a table of store destination to the additional information creation module;
the additional information creation module receives the table from the backup execution module, acquires the plurality of respective fragmented data items from the plurality of backup destination storage devices for each of the fragmented data groups by using the table, creates a parity data item by using the acquired plurality of fragmented data items, stores the created parity data item in the additional information storage medium, associates store destination of the parity data item with divided fragmented data group corresponding to the parity data item on the table, and transmits the table to the backup source storage device.

7. The backup system according to claim 6,
wherein each of the plurality of fragmented data items included in the divided fragmented data groups is data of a predetermined size,
wherein the backup execution module, when the fragmented data item included in the divided fragmented data group does not satisfy the predetermined size, and/or when the number of fragmented data items runs short in the divided fragmented data groups, prepares the plurality of fragmented data items included in the divided fragmented data group by adding dummy data.

8. A backup source device, comprising:
backup execution means, which back up backup target data to be a target for backup by transferring the backup target data to a backup destination storage device constituting a backup destination for the backup target data; and
generation data transmission means, which transmit additional information generation data required in order to generate additional information on the basis of the backup target data to additional information creation means for creating the additional information so that the additional information can be created by using the additional information generation data after a backup of the backup target data has been completed;
wherein the backup source device further comprises:
a timing selection module, which selects, on the basis of predetermined conditions, either one of synchronous timing for creating the additional information when the backup is performed or asynchronous timing for creating the additional information after the backup has been performed, as the timing for creating the additional information; and
a synchronous-type additional information creation module, which, when the synchronous timing is selected, creates the additional information when the backup is performed and stores this additional information in the additional information storage medium.

9. A backup method, comprising:
transmitting, by a backup source device which backs up backup target data to be a target for backup, the backup target data to a backup destination storage device;
creating additional information on the basis of the backup target data after a backup of the backup target data has been completed;
storing the created additional information in an additional information storage medium;
selecting, on the basis of predetermined conditions, either one of synchronous timing for creating the additional information when the backup is performed or asynchronous timing for creating the additional information after the backup has been performed, as the timing for creating the additional information; and
when the synchronous timing is selected, creating the additional information when the backup is performed and stores this additional information in the additional information storage medium.

10. A computer-readable storage medium having a computer-readable computer program, the program comprising:
code for backing up backup target data to be a target for backup by transferring the backup target data to a backup destination storage device constituting a backup destination for the backup target data;
code for transmitting additional information generation data required in order to generate additional information on the basis of the backup target data to an additional information creation module to create the additional information after the backup target data has been transferred to the backup destination storage device;
code for selecting, on the basis of predetermined conditions, either one of synchronous timing for creating the additional information when the backup is performed or asynchronous timing for creating the additional information after the backup has been performed, as the timing for creating the additional information; and
code for, when the synchronous timing is selected, creating the additional information when the backup is performed and stores this additional information in the additional information storage medium.

11. A backup system, comprising:
a backup destination storage device, which is the backup destination of backup target data to be a target for backup;
a backup source device that comprises a backup execution module to back up the backup target data by transferring the backup target data to the backup destination storage device;
an additional information storage medium configured to store additional information created on the basis of the backup target data; and
an additional information creation module to create additional information on the basis of the backup target data after a backup of the backup target data has been completed and then store the additional information in the additional information storage medium;
wherein a plurality of the backup destination storage device exists;
the backup execution module divides up the backup target data into one or more fragmented data groups containing a plurality of fragmented data items, distributes and transmits a plurality of fragmented data items contained in the divided fragmented data groups to the plurality of backup destination storage devices respectively, writes store destination of each fragmented data item included in each divided fragmented data group, and transmits a table of store destination to the additional information creation module;
the additional information creation module receives the table from the backup execution module, acquires the plurality of respective fragmented data items from the plurality of backup destination storage devices for each of the fragmented data groups by using the table, creates a parity data item by using the acquired plurality of fragmented data items, stores the created parity data item in the additional information storage medium, associates store destination of the parity data item with divided fragmented data group corresponding to the parity data item on the table, and transmits the table to the backup source storage device.

12. The backup system according to claim 11,
wherein each of the plurality of fragmented data items included in the divided fragmented data groups is data of a predetermined size,
wherein the backup execution module, when the fragmented data item included in the divided fragmented data group does not satisfy the predetermined size, and/or when the number of fragmented data items runs short in the divided fragmented data groups, prepares the plurality of fragmented data items included in the divided fragmented data group by adding dummy data.

13. An additional information creation device, comprising:
means for creating additional information on the basis of backup target data to be a target for backup after the backup target data has been transferred from a backup source device, which backs up the backup target data, to a backup destination storage device that is capable of storing data and a backup of the backup target data has been completed; and
means for storing the created additional information in additional information storage means;
wherein:
the backup target data is divided into one or more fragmented data groups including a plurality of fragmented data items, and the plurality of fragmented data items included in the divided fragmented data groups are distributed and transmitted from the backup source device to a plurality of backup destination devices;
the additional information creation device further comprises means for receiving a table of store destinations of each fragmented data item contained in each fragmented data group from the backup source device;
the means for creating additional information acquires the plurality of fragmented data items from the plurality of backup destination devices for each divided fragmented data group by using the received table and creates parity data by using the acquired plurality of fragmented data items;
the means for storing the created additional information stores the created parity data in the additional information storage medium;
the additional information creation device further comprises means for associating the store destination of the parity data with divided fragmented data groups corresponding to the parity data on the table, and means for transmitting the table to the backup source device.

* * * * *